United States Patent [19]
Engelberger et al.

[11] 3,744,032
[45] July 3, 1973

[54] STATIONARY BASE PROGRAMMED MANIPULATOR ARRANGEMENT FOR CONTINUOUSLY MOVING WORKPIECE

[75] Inventors: Joseph F. Engelberger; Maurice J. Dunne, both of Newton, Conn.

[73] Assignee: Unimotion, Inc., Bethel, Conn.

[22] Filed: July 15, 1971

[21] Appl. No.: 163,014

[52] U.S. Cl. .............................. 340/172.5, 219/80
[51] Int. Cl. .......................... G06f 15/46, B25j 9/00
[58] Field of Search .............................. 340/172.5; 235/151.1; 214/11 R

[56] References Cited
UNITED STATES PATENTS

| | | | |
|---|---|---|---|
| 2,988,237 | 6/1961 | Devol, Jr. | 214/11 R |
| 3,291,971 | 12/1966 | Dunne | 235/151.1 |
| 3,346,848 | 10/1967 | Viret et al. | 340/172.5 |
| 3,654,613 | 4/1972 | Dunne et al. | 340/172.5 |
| 3,654,616 | 4/1972 | Dunne et al. | 340/172.5 |
| 3,543,910 | 12/1970 | Devol | 198/34 |

*Primary Examiner*—Raulfe B. Zache
*Attorney*— Richard D. Mason, Reginald K. Bailey et al.

[57] ABSTRACT

A stationary base programmed manipulator arrangement is provided for cooperation with workpieces on a continuously moving conveyor. The manipulator arm is mounted for movement about a vertical axis to follow a workpiece on the conveyor and execute a predetermined pattern of operations on each workpiece as it moves past the manipulator station. The manipulator may be programmed by successively stopping the workpiece at different closely spaced locations along the conveyor path, successively moving the manipulator arm to positions corresponding to different points on a representative workpiece when said workpiece is positioned at said different locations, and recording said corresponding positions to which said arm is successively moved.

In the alternative, the manipulator arm may be programmed in a so-called "limp hand" mode of control, wherein the manipulator arm is programmed to move rapidly to each new point on the workpiece at which an operation such as a spot weld, is to be performed. While the spot weld is being made and the welding jaws are clamped to the moving workpiece the actuators of the manipulator are disabled so that the arm is permitted to move in synchronism with the workpiece by virtue of the connection of the welding jaws to the moving workpiece. As soon as the spot weld is completed, control is restored to the manipulator arm actuators and the manipulator arm is moved ahead to the next programmed spot weld point. A compensating arrangement may also be provided to overcome the frictional drag of the manipulator arm actuators so that the limp arm may be moved by engagement with the moving workpiece without damaging the workpiece. A disabling arrangement may also be provided for the manipulator arm actuators whenever the manipulator arm deviates from a desired work path by a predetermined amount.

With either type of programming, the recorded program may be shifted from one program step to the next under the control of a conveyor synchronizing signal derived from and representative of the movement of the conveyor even though the manipulator arm has not completed the movements called for in each axis by the previous program step.

47 Claims, 11 Drawing Figures

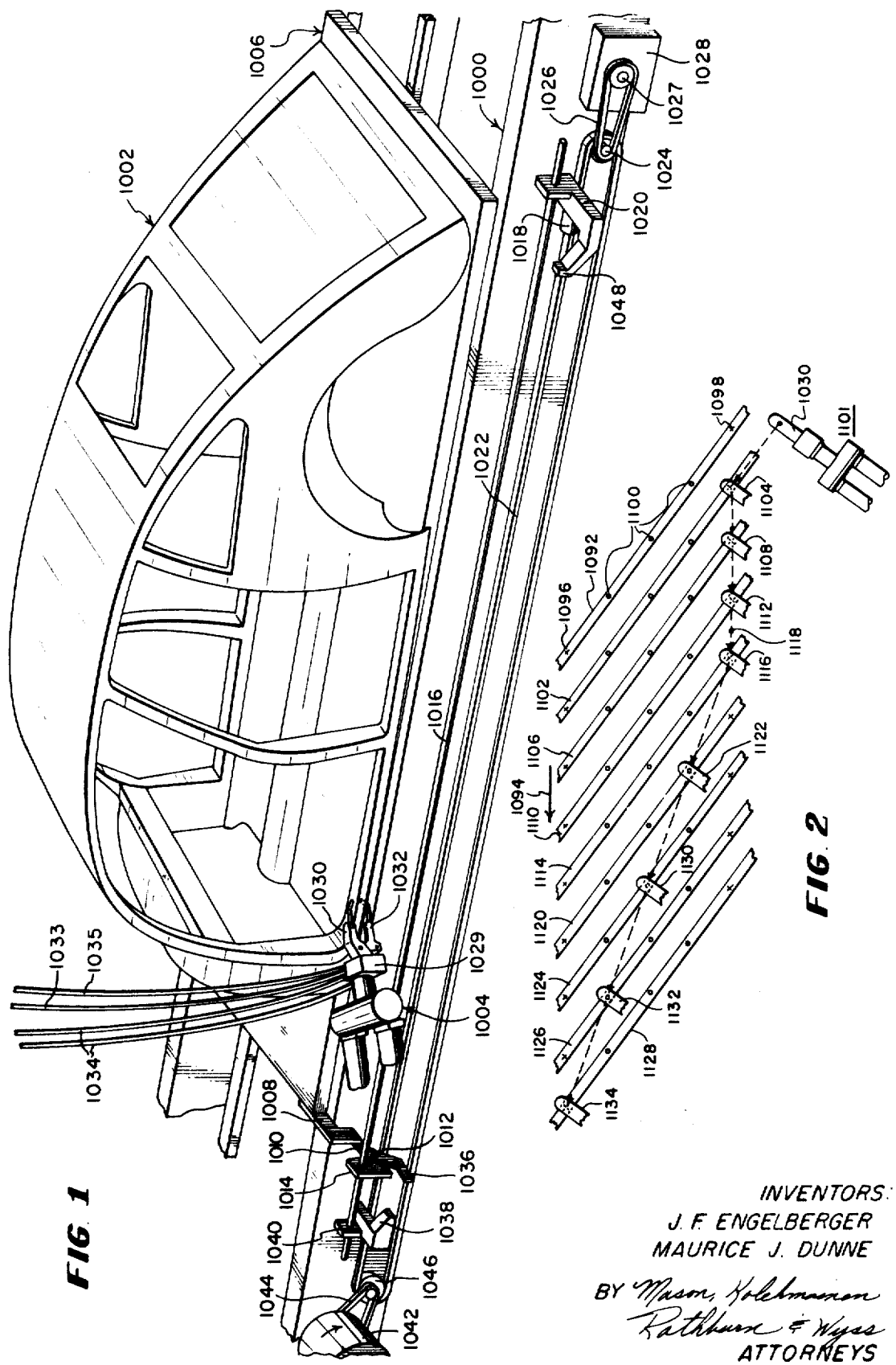

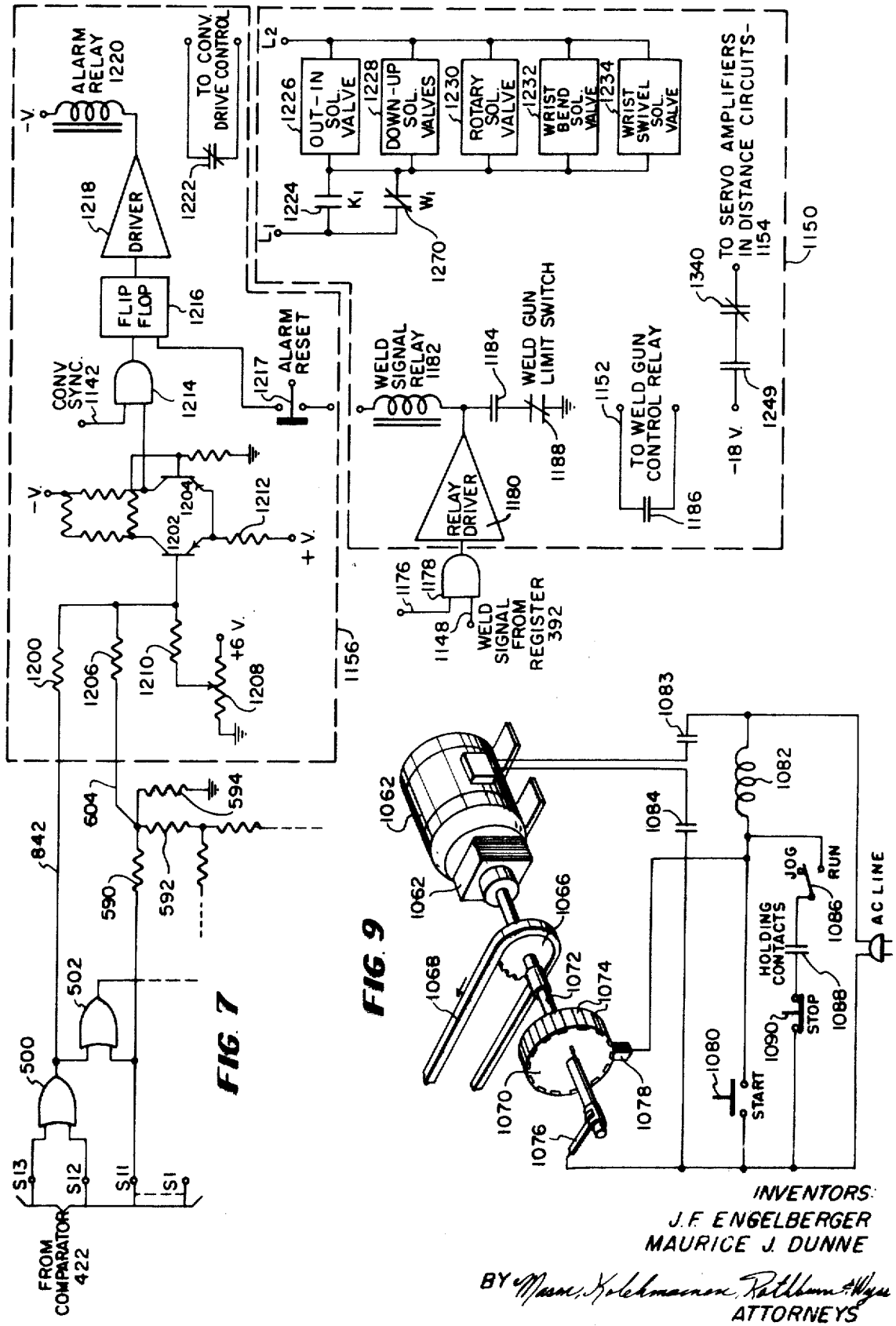

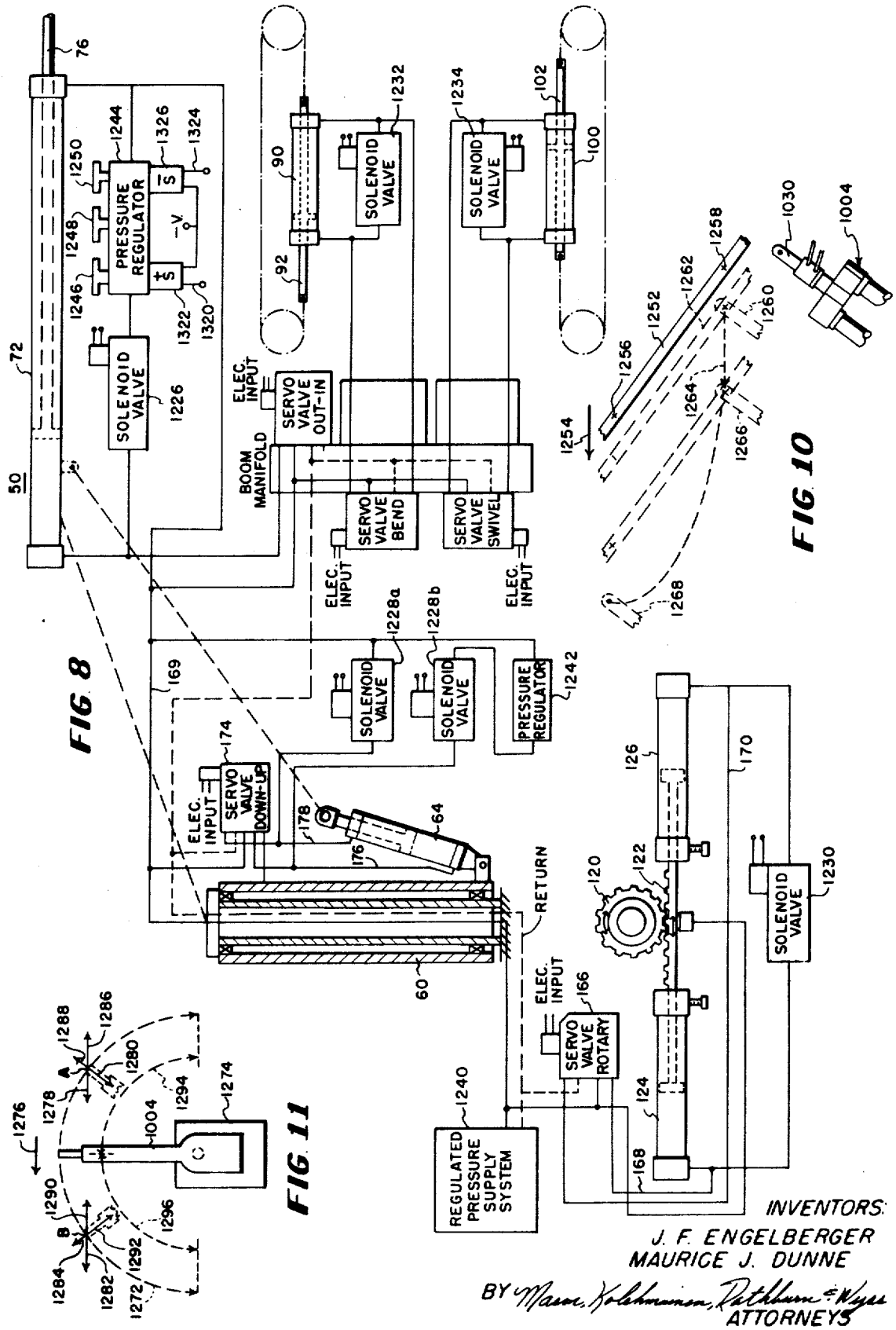

STATIONARY BASE PROGRAMMED MANIPULATOR ARRANGEMENT FOR CONTINUOUSLY MOVING WORKPIECE

The present invention relates to programmed manipulators, and more particularly, to an arrangement whereby the programmed manipulator base may remain fixed and the manipulator arm moved through a series of programmed steps in coordination with a continuously moving workpiece. While the invention is particularly suitable for and will be described in connection with the welding of car bodies, or the like, on a continuously moving conveyor line, it will be understood that the arrangement of the present invention is equally suitable for performing other types of operations on a continuously moving workpiece.

Programmed manipulators of the type shown, for example, in Dunne, et al. application Ser. No. 808,152, filed Mar. 18, 1969, have been employed in the past to perform various types of operations on conveyor carried workpieces. Thus, in Devol U.S. Pat. No. 3,283,918 an arrangement is shown wherein the programmed manipulator is bodily moved on rails parallel to a continuously moving conveyor and in timed relation with the workpiece so that there is no relative movement between the programmed manipulator and the workpiece during the working cycle. While this arrangement is generally suitable for its intended purpose, it has the disadvantage that the bodily movable programmed manipulator requires a considerable amount of floor space which must be considered off limits for human operators and hence a large amount of space is required to perform the required welding operations on a given car body, or the like. In addition, the entire programmed manipulator must be moved along the rails and because of the weight of the manipulator, the services that must be provided, such as welding cables, air hoses, and the like, and the length of movement of the manipulator along these rails, the equipment necessary to move the manipulator along these rails is the most expensive of any of the motions of the programmed manipulator. Furthermore, installation of a rail system to carry one or more programmed manipulators along a given conveyor line is costly and disruptive of production during installation, servicing and the like.

Another arrangement which has been heretofore used in connection with the welding of car bodies on an automobile assembly line is to employ a so-called indexing or start-stop conveyor line in which the car bodies are sequentially moved to different stations opposite a group of fixedly positioned programmed manipulators and the conveyor is held stationary while a given welding operation is performed on a given car body at each station. Such an arrangement has the disadvantage that the indexing conveyor moves considerably slower than a continuously moving conveyor since the car bodies must be stopped at each station during the entire welding operation performed by a programmed manipulator. In addition, the complexity of the conveyor drive system necessary to stop the conveyor accurately at each programmed manipulator station considerably increases the cost of the overall conveyor system required. Furthermore, and most important, when an indexing conveyor system is employed, it is not practical to mix human operators in with programmed manipulators on a given conveyor line because the human operators will always have to be protected with safety buttons and then the entire conveyor line will move only as fast as the slowest operator on the line.

It is, therefore, a principal object of the present invention to provide a new and improved programmed manipulator arrangement which may be employed with a continuously moving conveyor line and wherein one or more of the above-described disadvantages of the prior art arrangements are eliminated.

It is another object of the present invention to provide a new and improved programmed manipulator arrangement in which the base of the manipulator is fixed and the manipulator arm is programmed to perform a series of operations on a workpiece carried by a continuously moving conveyor.

It is a further object of the present invention to provide a new and improved programmed manipulator arrangement wherein the base of the manipulator remains fixed during both teaching and repeat modes of operation, the manipulator arm is taught successive program steps while the workpiece is held stationary at successive positions along the conveyor line, and during the repeat mode of operation the workpiece is moved continuously past the manipulator station while the manipulator arm cooperates therewith to perform the desired series of operations thereon.

It is another object of the present invention to provide a new and improved programmed manipulator arrangement in which the base of the manipulator is fixed and a series of spot welding operations are performed on a car body which is continuously moving past the manipulator station.

It is still another object of the present invention to provide a new and improved programmed manipulator arrangement wherein the manipulator arm is programmed to perform a series of spot welding operations on a conveyor driven car body and the manipulator arm is moved independently of the hydraulic drive actuators of the manipulator during periods when the welding jaws are in contact with the moving car body.

It is a further object of the present invention to provide a new and improved programmed manipulator arrangement for use with a continuously moving conveyor arranged to carry substantially identical workpieces past the manipulator, which includes program means for developing a series of command signals corresponding to different positions of the manipulator arm and control means responsive to said series of command signals for moving said manipulator arm so that it describes a predetermined work path in relation to a moving workpiece on said conveyor.

It is a further object of the present invention to provide a new and improved arrangement for programming a fixed base manipulator for cooperation with a workpiece on a continuously moving conveyor wherein the workpiece is successively positioned at stationary locations along the conveyor path, the manipulator arm is successively moved to positions corresponding to different points on the workpiece when the workpiece is positioned at said stationary locations, and the corresponding positions to which the arm is successively moved are recorded to provide a program which can be continuously repeated during continuous movement of similar car bodies along the conveyor path.

It is another object of the present invention to provide a new and improved fixed base manipulator arrangement which can perform programmed operations on a workpiece carried by a continuously moving conveyor and wherein compensation is provided for variations in the speed of said conveyor.

It is a further object of the present invention to provide a new and improved fixed base manipulator arrangement which can perform programmed operations on a workpiece carried by a continuously moving conveyor, said manipulator having an arm rotatable about a vertical axis and wherein provision is made for coordinating relative motions of said arm in different axes so as to effect synchronous movement with the conveyor.

The invention, both as to its organization and method of operation, together with further objects and advantages thereof, will best be understood by reference to the following specification taken in conjunction with the accompanying drawings in which:

FIG. 1 is a perspective view of the stationary based programmed manipulator arrangement of the present invention shown in conjunction with a continuously moving conveyor line in connection with which the programmed manipulator is arranged to perform a series of spot welding operations on car bodies located on the moving conveyor;

FIG. 2 is a fragmentary top view of the arrangement of FIG. 1 showing the manner in which the manipulator arm and conveyor are positioned during one mode of programming of the fixed base manipulator of FIG. 1 in accordance with the invention;

FIG. 7 is a schematic diagram of certain control circuits employed in the manipulator arrangement of FIG. 1 to control the manipulator in response to a taught weld signal and to provide an alarm signal in the event the manipulator arm does not correctly follow the continuously moving conveyor of FIG. 1;

FIG. 8 is a schematic diagram of the hydraulic components of the manipulator of FIG. 1 with particular reference to the manner in which these hydraulic drive components may be disabled during weld gun operation;

FIG. 9 is a schematic diagram of a conveyor drive arrangement which may be employed during the mode of programming illustrated in FIG. 2;

Figure 3:
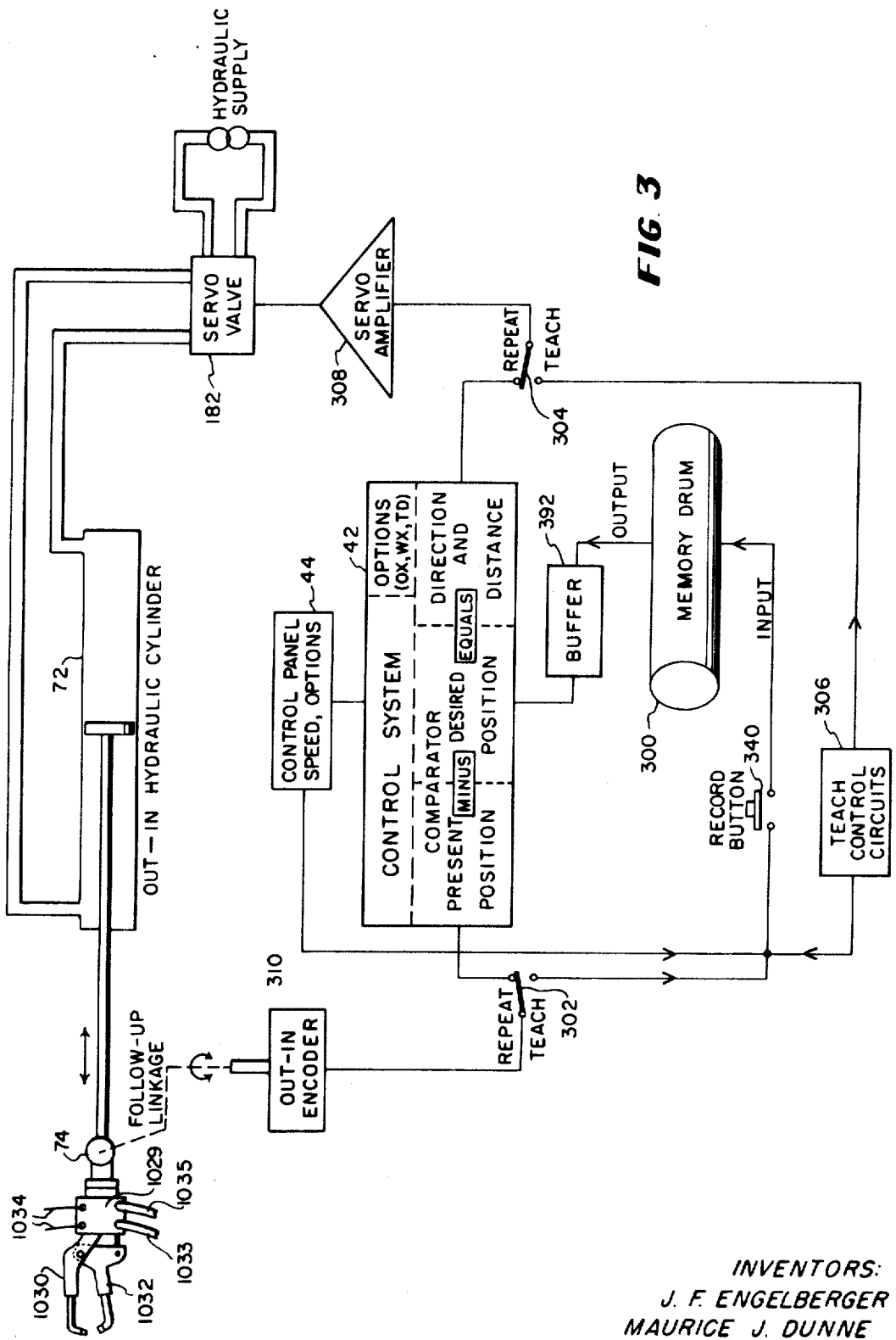
FIG. 3 is a basic block diagram of the control portion of the manipulator of FIG. 1, illustrated in conjunction with a single controlled axis thereof.

FIG. 10 is a fragmentary top view of the arrangement of FIG. 1 showing the manner in which the manipulator arm and conveyor are positioned during a "limp hand" mode of programming of the fixed base manipulator of FIG. 1 in accordance with the invention; and FIG. 11 is a diagrammatic illustration of the manipulator of FIG. 1 showing the manner in which frictional drag is compensated during the welding operation when programmed as illustrated in FIG. 10.

Referring now to the drawings and more particularly to FIGS. 1 to 9, inclusive, the present invention is therein illustrated in conjunction with a conveyor line indicated generally at 1000 which carries a series of car bodies, one of which is indicated generally at 1002, past a series of fixed base programmable manipulators the movable arm of one of these manipulators being indicated generally at 1004. The programmable manipulators 1004 are preferably of the type shown and described in detail in copending Dunne, et al. application Ser. No. 64,802 filed Aug. 18, 1970 and reference may be had to said copending application for a detailed description of such a programmable manipulator, said detailed description being hereby incorporated herein by reference. Since many of the control circuits and memory drum circuits of the manipulators 1004 are identical to that described in the above-identified copending Dunne, et al. application Ser. No. 64,802, the same reference numerals have been applied in the present application to corresponding elements disclosed and similarly referred to in the said copending Dunne, et al. application.

The car bodies 1002 may be individually supported on carriers 1006 forming a part of the continuously moving conveyor 1000, each of the carriers 1006 being provided with an indicator arm 1008 which extends outwardly beyond the side of the conveyor 1000. The car body 1002 is accurately positioned relative to its carrier 1006 by any suitable registration arrangement, and, as the carrier 1006 is moved along the conveyor line, the indicator arm 1008 engages the end 1010 of a control lever 1012 which is pivotally mounted on a block member 1014 which is slidably mounted on a guide bar 1016, the guide bar 1016 being fixedly mounted alongside the conveyor 1000 by any suitable means. The block member 1014 is normally held against a stop post portion 1018 of an adjustable stop member 1020 which is also slidably mounted on the guide bar 1016 and may be adjusted to any desired initial position relative to the conveyor 1000 and remains fixed at this desired position once adjusted. When the indicator arm 1008 engages the end 1010 of the lever 1012 the block 1014 slides along the guide bar 1016 and the block 1014 is also secured to the upper run 1022 of a drive chain which is connected to a sprocket 1024. The sprocket 1024 is connected through an auxiliary chain 1026 to the rotary input shaft 1027 of an encoder device indicated generally at 1028. The encoder device 1028 may be similar to the encoders employed for the various controlled axes of the programmed manipulator 1004, as described in detail in the above-identified copending Dunne, et al. application Ser. No. 64,802, these encoders being arranged to provide a continuously changing digital output signal representing the absolute position of the block 1014 as it is moved in the manner described above in synchronism with the conveyor 1000. The encoder 1028 is arranged to produce a zero digital signal when the block 1014 is in engagement with the stop 1018 and, as the block 1014 is moved along the conveyor line 1000 with the car body 1002, the conveyor encoder 1028 produces a digital output signal which accurately represents the position of the car body relative to the fixed stop 1018.

In accordance with the present invention, this digital encoder output signal is employed to control movement of the manipulator arm 1004 of the previously programmed manipulator so that this arm follows a predetermined work path over a particular area of the car body at which the manipulator has been programmed to produce a series of spot welding operations. More particularly, the manipulator 1004 is provided with a weld gun 1029, having a pair of welding electrodes 1030 and 1032, which is mounted on the end of the manipulator arm 1004 for rotation about the wrist swivel axis of the manipulator as described, for example, in copending Dunne, et al. application Ser. No. 50,441, filed June 29, 1970 and assigned to the same assignee as the present invention.

While reference may be had to said Dunne, et al. application for a detailed description, it may be generally stated that the welding electrode 1032 may be movable under the control of a pneumatically operated cylinder the actuation of which is controlled by the application of air pressure to input and output conduits 1033 and 1035 by means of suitable flexible overhead air hoses, as will be readily understood by those skilled in the art. When the piston of the actuating cylinder is moved forwardly the electrodes 1030 and 1032 clamp a particular part of the frame of the car body 1002 between these welding jaws and an electrical spot welding operation can then be performed by means of electrical power supplied through the overhead cables 1034.

When the car body 1002 has been moved past the manipulator arm station and the desired series of spot welding operations has been performed by this manipulator, it is necessary to return the block 1014 to the stop 1018 so that a conveyor synchronizing signal may be produced by the encoder to control movement of the manipulator arm 1004 when the next car body approaches this station and the indicator arm 1008 thereof engages the block 1014. To this end, the end 1036 of the pivotally mounted lever 1012 is engaged by the inclined camming surface 1038 of an adjustable cam member 1040 which is mounted on the guide bar 1016 and may be adjusted to any desired cutoff position along this guide bar. The drive chain 1022 and the block 1014 secured thereto are continuously urged in the direction of the stop 1018 by means of a back venting air motor or stallable torque motor 1042 which is connected through a drive chain 1044 and the sprocket 1046 to the chain 1022. Accordingly, when the end 1036 of the lever 1012 engages the cam surface 1038, the lever 1012 pivots about the block 1014 as the car body continues to move so that the end portion 1010 thereof is moved downwardly beneath the end of the indicator arm 1008. The block 1014 is then free to move back to its initial position against the stop 1018 under the biasing force of the back venting air motor 1042. As the block 1014 returns to the stop 1018, the arm portion 1036 of the lever 1012 engages an inclined cam portion 1048 of the stop 1020 which returns the lever 1012 to its initial position for engagement by the arm 1008 of the next car body. The cam portion 1048 also acts as a snubber which decelerates the block 1014 and prevents damage to the gearing connected to the encoder 1028. However, the snubber portion 1048 is sufficiently resilient that the block 1014 is always moved to the same starting position against the stop post 1018. Since the manipulator arm may cover a distance of as much as 18 feet along the near edge of the conveyor, a 13 bit encoder is preferably used as the encoder 1028, i.e., an encoder similar to the rotary encoder shown and described in said Dunne, et al. application Ser. No. 64,802. Such an encoder provides approximately 8,000 numerical bits for the total conveyor movement measured thereby and is adequate to permit precise programming of the conveyor at one inch intervals in accordance with the present invention. Accordingly, the encoder drive sprockets and the gear ratios should be such that the input shaft 1027 of the encoder 1028 is driven at the correct angle to move the encoder through its full range in response to maximum travel of the block 1014 along the conveyor 1000.

In accordance with the present invention, the manipulator 1004 may be initially programmed in either one of two modes so as to permit the manipulator arm of the fixed base manipulator 1004 to perform the desired series of spot welding operations on the moving car body 1002.

Under the first mode of programming, which may be called a simulated continuous path mode of programming and is described in connection with FIGS. 1 to 9 of the drawings, the manipulator 1004 is initially programmed by controlling the conveyor 1000 so that the car body 1002 is moved in very short increments, in the order of 1 inch, and the car body 1002 is stopped after each increment of movement of the conveyor 1000 to permit programming of the manipulator arm to a different point on the car body. The manipulator 1004 is thus taught a different position for each 1 inch advance of the car body 1002 and in addition, a weld signal is taught at particular points at which a spot welding operation is to be performed on the car body 1002. Also, when the arm is being programmed to move in a predetermined path relative to the car body 1002, the digital output of the conveyor encoder 1028 is recorded and a conveyor sync signal is also taught at each conveyor position which is utilized during playback to control the selection of different program steps of the recorded program of the manipulator by comparison of the actual encoder signal with the recorded conveyor encoder command signal, as will be described in more detail hereinafter.

After the manipulator 1004 has been programmed in coordination with the incremental advance of the car body 1002 past the manipulator station, the conveyor 1000 is arranged to be driven at a continuous speed, for example, four inches per second, and as the encoder 1028 is driven by the moving car body it produces a digital output signal representing movement of an unwelded car body 1002 past the manipulator station, the program steps of the manipulator 1004 are sequentially selected so that the manipulator arm 1004 moves along with a continuously moving car body 1002 and over a predetermined work path area thereof at which spot welds are to be made.

When a spot weld is to be made on the car body 1002 the electrodes 1030, 1032, clamp a particular area of the car body and hence the end of the manipulator arm 1004 is engaged with the continuously moving car body 1002 for an appreciable amount of time. If the conveyor 1000 is moving at a speed of four inches per second, and the welding jaws 1030, 1032 are closed for approximately six-tenths of a second, then the manipulator arm 1004 will be rigidly connected to the moving car body for approximately 2.4 inches, i.e., while the car body is moving several inches.

Under the simulated continuous path mode of programming of the manipulator 1004, the manipulator arm is programmed to move in the direction of conveyor travel during periods when a weld is being made and the electrodes 1030, 1032 are in engagement with the moving car body. Under this mode of programming it is assumed that the synchronized movement of the manipulator arm relative to the moving car body is sufficiently precise that the electrodes may be clamped to a particular point on the car body and the spot weld made without appreciable relative movement between the weld electrodes and the car body for the duration of weld. It will be understood that if relative movement occurs between the electrodes 1030, 1032, and the car body while these electrodes are being clamped to the car body, the spot weld would be imperfectly made, and the relatively thin car body could buckle or bend, since the actuators moving the manipulator arm are relatively powerful. In this connection, it is pointed out that in the second mode of programming of the manipulator arm in accordance with the present invention a so-called "limp hand" mode of control is effected, as will be described in more detail in connection with FIGS. 10 and 11 of the drawings. Under this limp hand mode of control, the hydraulic drive actuators of the five controlled axes of the manipulator are disabled when the welding electrodes 1030, 1032 close so that the end of the manipulator arm may be freely moved in all controlled axes by the external force of the moving car body exerted through the clamped welding electrodes. In addition, under the limp hand mode of control, the frictional drag produced by the in-out hydraulic actuator is compensated to permit the manipulator arm to be freely moved by engagement with the moving car body. Accordingly, while it is contemplated that the simulated continuous path mode of programming is sufficiently accurate to permit conventional drive of the manipulator arm during periods of contact of the welding electrodes with the moving car body, it is also possible to provide for disabling of the hydraulic actuator during engagement of the welding electrodes with the moving car body, as will be described in more detail hereinafter in connection with the limp hand mode of control.

Since the manipulator 1004 is initially programmed at points which are quite closely spaced together, corresponding to each one inch advancement of the car body, it will be evident that a simulated continuous path control of the manipulator 1004 is achieved during playback whereby welds which are relatively close together and spaced along a contoured path, such as a wheel opening in the car body 1002, or the like, may be made. However, if the manipulator arm 1004 is brought to a complete stop at the end of each program step, as may be done in conventional programmed manipulators of the type described in Dunne, et al. application Ser. No. 64,802, the movement of the manipulator arm, in relation to the continuously moving car body 1002, during playback, would be quite discontinuous since the manipulator arm would accelerate and decelerate from one coincidence to the next whereas the car body 1002 would be moving continuously at a fixed rate.

While the Dunne, et al. application Ser. No. 64,802 also proposes the use of artificial coincidence signals to control movement to the next program step before total coincidence is reached, such mode of control is not sufficient to maintain synchronism between the manipulator arm and the moving conveyor over long periods of time and under changing environmental conditions.

In accordance with a further aspect of the present invention, the selection of the successively taught program steps is controlled not by total coincidence between the encoders of the various controlled axes of the manipulator and their respective command signals from the memory drum, but instead the successive program steps are selected by comparison of the output of the conveyor encoder 1028 with the conveyor command signal which was recorded at each 1 inch position of the car body 1002 during the teaching operation. This comparison may be made to a predetermined but adjustable accuracy by means described in more detail hereinafter. Accordingly, the memory drum of the manipulator 1004 is continuously stepped to successive program steps under the control of digital signals from the conveyor encoder 1028 so that the hydraulic actuators of the manipulator arm 1004 receive continuously changing velocity commands which integrate into a continuous path which always keeps the weld gun electrodes 1030, 1032 in approximately the correct relationship with the moving car body 1002. The manipulator arm 1004 thus moves in a predetermined pattern with respect to the moving car body 1002 whether or not contact exists between the welding jaws 1030, 1032 and the car body 1002. In this connection it will be understood that the location of the spot welds on the car body 1002 may be made within an accuracy of approximately ⅛ inch so that some phase lag between the moving manipulator arm 1004 and the moving car body 1002 can be tolerated.

Since it is necessary to return the manipulator arm 1004 to its initial starting position for cooperation with the next car body 1002 and this initial position should be accurately located with respect to the stop post 1018 for initiation of the next spot welding operation, the programmed manipulator 1004 is arranged to change from one program step to the next under either one of two modes of control. In the first mode of control the arm is controlled in the conventional manner by total or artificial coincidence of the command and encoder signals associated with all five controlled axes of the manipulator, as described in detail in the above-identified Dunne, et al. application. In the second mode of control selection of programmed steps is controlled solely by comparison of the digital signal from the conveyor encoder 1028 and the previously recorded conveyor command signal. In order to shift between these two modes of control, a conveyor sync signal is taught during all of the programmed steps at which control of the manipulator 1004 is arranged to be accomplished through the conveyor encoder 1028, as will be described in more detail hereinafter.

Considering now the control system portion of the manipulator apparatus 1004, reference is made to FIG. 3 wherein the basic components of the control system are shown in block diagram form in conjunction with one controlled axis, the out-in axis, of the manipulator apparatus. The control system includes a continuously rotating memory drum 300 in which digital information may be stored relative to three different programs each consisting of a number of program steps up to a maximum of 60 steps in each program. The control system of the manipulator apparatus has two basic modes of operation. The first mode is a so-called teach mode in which the hydraulically powered manipulator arm is moved to the series of successive positions to which the arm is to be successively moved during repetitive working or repeat cycles. Each time that the manipulator arm is moved to a new position this position is recorded on the memory drum 300, together with associated auxiliary signals relating to how that particular program step is to be carried out. To this end, a pair of teach-repeat switches 302, 304 are provided. When the switches 302, 304 are thrown to the teach position, the teach control circuits 306 are connected to the input of the servo amplifier 308 which controls the out-in servo valve 182.

The teach control circuits 306 include suitable voltage sources for moving the manipulator arm in all five axes, as well as controls relative to the accuracy with which the arm is to be moved to the desired position, the control of the weld gun cycle if a spot weld is to be performed at a particular position, the shifting of program step control to the conveyor encoder 1028, and other functions, as will be described in more detail hereinafter. The signal supplied to the out-in servo amplifier 308 opens the valve 182 by an amount determined by the amplitude of this signal so that the hydraulic cylinder 72 moves the weld gun 1029 in the desired direction along the out-in axis. For purposes of illustration, the servo valve 182 is shown in FIG. 3 as having bi-directional outputs to the out-in hydraulic cylinder 72. However, it will be understood that with reference to the particular cylinder 72, the rod side of the cylinder is supplied with system pressure rather than through the servo valve 182, as will be described in more detail hereinafter. The resulting pressure on the piston of the cylinder 72 moves the weld gun in or-out, depending upon the polarity of the electrical signal developed by the teach control circuit 306.

In order to provide digital information representing the absolute position of the arm in each of the five controlled axes of movement thereof, there is provided a series of digital encoders, one for each controlled axis, an out-in encoder 310 being provided to develop a digital signal which represents the absolute position of the weld gun in this axis in digital form. Similar encoders are provided to develop absolute position signals which change in a digital manner in response to movement of the manipulator in the other four controlled axes, as described in detail in said above-identified Dunne, et al. application Ser. No. 64,802. Each of these encoders, as well as the conveyor encoder 1028, is preferably of the type shown in an application of George Hamlin Leonard, Ser. No. 494,524, filed Oct. 11, 1965, in order to provide a high degree of accuracy of the digital information developed by the encoder while at the same time providing for relatively long distances of travel in each of the controlled axes.

Referring again to the teach mode of operation of the control system, when the weld gun 1029 has been moved to the desired position relative to the car body 1002 positioned at a particular conveyor position as indicated by the digital output of the conveyor encoder 1028, the encoders 310 and 1028 continue to develop digital output signals representing this final position of the weld gun in the out-in axis relative to the conveyor 1000. The manipulator arm is also positioned in the other four axes of movement so that the weld gun is in a desired final position and orientation, relative to the conveyor 1000, to which it is to be moved during a repeat cycle. The digital signals which are continuously produced by these encoders are supplied through the switch 302 to one side of a normally open record button 340. In addition, certain other signals are supplied to the record button 340 from the teach control circuits 306, and also from the control system as set up on the control panel 44, which indicate other functions which are to be performed in conjunction with movement of the manipulator arm to the desired position. The record button 340 is then depressed and supplies all of these signals to the memory drum 300, so that the information represented thereby is recorded on the memory drum 300 at a desired position corresponding to the particular program step which is being taught. Preferably, the digital signals which are developed by the encoders such as the encoder 310, are in reflected binary code, as distinguished from standard binary code, for the reason that the reflected binary signal is one in which only one digit changes between successive numbers in the code.

After the record button 340 is released the conveyor 1000 is moved one inch and the teach control circuits 306 are actuated so as to move the weld gun 1029 to a new position by energization of those ones of the hydraulic cylinders in each axis which must be changed from the previously programmed position. When the next position is reached, the record button is again depressed so as to record the new digital information for each axis at the new program step area of the memory drum 300. This sequence of operations is carried out until the manipulator arm has been moved to the last desired position at which point an end of program bit is recorded in the memory drum 300 along with information relating to the last program step.

After a complete program consisting of a number of positions to which the manipulator arm is to be moved in succession has been recorded in the memory drum 300, the repeat-teach switches 302 and 304 are thrown to the repeat position. In this position the output of the encoders, such as the encoders 310 and 1028, are supplied to a comparator portion of the control system and the desired position in each axis is sensed from the memory drum 300 and stored in a buffer storage register 392. The comparator compares, in each axis, the encoder signal with the memory drum command signal and derives both a direction signal signifying the direction in which the hand should be moved to reduce the error, and a distance signal corresponding to the difference between the encoder signal representing the actual position of the hand assembly 80 and the desired position as stored in the memory drum. In the illustrated out-in axis, these signals are supplied by way of the switch 304 to the servo amplifier 308 which controls the servo valve 182 so that the cylinder 72 moves the hand assembly in the correct direction to reduce the error signal to zero or to some programmed magnitude of error signal.

In accordance with a feature of the present invention, shifting from one program step to another may be accomplished by two different modes of control. Under the first mode of program step control, when final coincidence of a desired accuracy is obtained in all axes of the apparatus, the next programmed step is read into the buffer storage register 392 and is compared with the various encoders in each axis and the corresponding error signals are employed to drive the corresponding hydraulic cylinders to the next programmed point in each axis.

Under the second mode of program step control, shifting to the next program step is determined by comparison of the digital output signal from the conveyor encoder 1028 with its programmed command signal and irrespective of whether or not coincidence has been achieved in the controlled axes of the manipulator. Accordingly, a shift to the next program step is automatically produced each inch of travel of the continuously moving conveyor 1000. If the manipulator arm has not quite reached the position called for by a given program step when a shift to the next program step is made, the error signal presented to each servo valve is slightly larger and the arm moves slightly faster toward the position called for by this next program step. In this way a self-adjusting or self-correcting action is produced whereby the manipulator arm is continuously controlled to move over a predetermined work path in the moving car body despite variations in conveyor speed, manipulator arm speed between programmed positions and other factors tending to destroy the desired synchronism between the manipulator arm and the moving car body.

Figure 4:
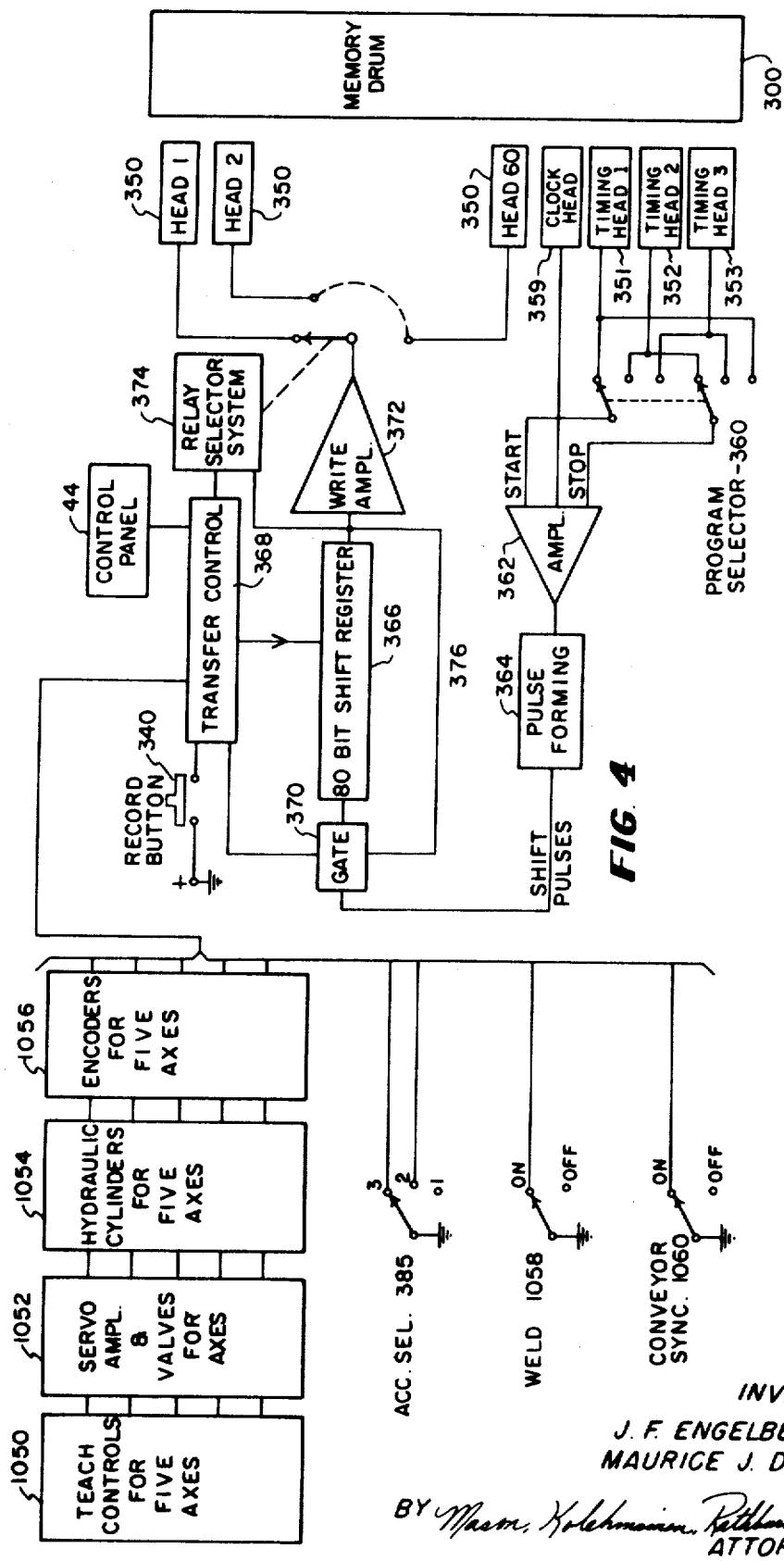
FIG. 4 is a more detailed block diagram of the control system of the fixed base manipulator of FIG. 1 when operated in the teaching mode and illustrating the manner in which information relative to the spot welding operations performed on the continuously moving car bodies of FIG. 1 are recorded on the memory drum during the teaching mode of the manipulator.

Referring now to FIG. 4, the control system of the manipulator apparatus is shown therein in somewhat more detailed block diagram form and illustrates the manner in which the memory drum 300 is programmed during the teaching mode of operation. The memory drum 300 is provided with a series of 60 read-write heads 350 which are spaced along the length of the memory drum 300 and may be employed as either write heads during the teaching operation or as read heads during the repeat mode of operation of the apparatus. In order to increase the program step capacity of the storage apparatus the periphery of the drum is divided so that a first program interval is provided for the first third of a drum revolution, a program two interval is provided during the second third and a program three interval during the final third of each drum revolution. The end points of each of the program intervals are defined by word tracks which are permanently recorded in the memory drum 300 and occur once each revolution at the desired staggered intervals to define the desired program intervals. A series of three timing heads 351, 352 and 353 are provided to sense these word tracks, the timing head 351 detecting the word one track pulses the head 352 detecting the word two pulses and the head 353 detecting the word three pulses. The outputs of the heads 351, 352 and 353 are supplied to a program selector 360 so as to control the start and stop points of a particular program interval. During the first program interval clock pulses which are detected by a clock head 359 are selectively supplied to an amplifier 362, the start and stop pulses derived from the program selector 360 being employed to prevent further clock pulses derived from the clock track from appearing in the output of the amplifier 362 during the second and third program intervals. In the present embodiment a large number of program steps may be required to provide the above described simulated continuous path movement of the manipulator arm in synchronism with the continuously moving conveyor 1000. Accordingly, the three program intervals may all be utilized for a desired movement of the manipulator arm, thus giving a total of 180 program steps available. In this connection, it will be understood that the return of the manipulator arm to its initial position after the spot welding operations have been completed and other gross movements of the arm may be made in the conventional manner wherein a single program step may be used to move the manipulator arm many feet. It is only when the arm must move in closely coordinated relationship to the moving work piece that a large number of program steps is required.

The clock pulses which are selectively transmitted to the amplifier 362 are supplied to a pulse forming circuit 364 and are then employed as shift pulses which are supplied to an eighty bit shift register 366. In the illustrated embodiment, each program interval includes eighty clock pulses so that 80 bits of information may be recorded along one-third of the periphery of the memory drum 300 during one step of a particular selected program interval. As described in said Dunne, et al. copending application Ser. No. 64,802, 55 information bits are required to record all five positions of the encoders for the five controlled axes. Another 13 bits is required to record the digital output of the conveyor encoder 1028. In addition, other auxiliary functions may be selected by the teach control circuits and the control panel 44 and recorded in the memory drum at a particular program step so as to cause the manipulator apparatus to perform auxiliary functions in conjunction with a particular step. For example, a bit designating that the manipulator shall move at a slow speed to the programmed end point may be recorded. Bits representing different accuracies with which the manipulator is to be moved to the designated positions may be recorded, or a bit indicating the end of a particular program may also be recorded. Also, a number of other bits may be recorded for various optional types of operation of the manipulator apparatus with other apparatus, including interlock circuits, and the like. For example, in the illustrated embodiment the manipulator arm should be returned to its initial position at the end of each spot welding operation and wait until the next car body arm 1008 engages the block 1014 and moves it away from the stop 1018. Accordingly, a "wait external" signal would be programmed at this initial position and the manipulator arm remains at its initial position until movement of the block 1014 produces a control signal, as by closure of a microswitch (not shown), or the like, this switch closure then providing total coincidence and shifting to the next program step, as described in more detail in said Dunne, et al. application Ser. No. 64,802. A number of additional storage bits are thus available in the 80 bit shift register 366 for such options.

Considering now the actual operation of the manipulator apparatus in recording a particular program step during a teaching operation, the teach controls 1050 are individually associated with each controlled axis and comprise plus and minus variable voltage sources which may be selectively supplied to the servo amplifiers and servo valves 1052 of a particular axis through separate push buttons. The servo valves of the respective axes respond to the electrical signals developed during the teaching operation by moving the corresponding hydraulic cylinders 1054 and the consequent movement in the particular axis is also operative to move the corresponding encoders 1056 a proportionate amount. Therefore, as a result of the teaching operation in each axis, the weld gun 1029 is moved to a desired position which is thereafter continuously represented by the digital outputs of the encoders 1056.

An accuracy selector switch 385 is also adjusted to determine how closely the manipulator arm should approach the programmed position before an artificial total coincidence signal is produced and the next program step is selected, as described in said Dunne, et al. application. In addition, a weld control switch 1058 is provided which is thrown to the ON position when it is desired to make a weld starting at a particular position. Also, a conveyor sync switch 1060 is provided which is thrown to the ON position whenever the shifting from one program step to another is desired to be under the control of the conveyor encoder 1028. The switch 1060 would thus be thrown to the ON position when the manipulator arm has been moved to its initial position for the start of the welding operation on the car body 1002 and would remain in the ON position during the programming of the manipulator arm in correlation with incremental movement of the conveyor 1000. However, the switch 1060 is thrown to the OFF position when the welding operation is completed since synchronism with the conveyor 1000 is no longer required and the manipulator arm may be returned to its initial position in a conventional manner under control of the total coincidence circuits described in said Dunne, et al. application. In this connection, it will be understood that as the conveyor 1000 is stepped in one inch increments during the teaching operation, the conveyor encoder continuously develops a digital signal representing each incremental position of the conveyor at which the manipulator arm is programmed.

Preferably, the voltages developed by the teach controls are of relatively small amplitude so that the manipulator arm is moved relatively slowly in each axis thereby facilitating the exact positioning of the welding jaws 1030, 1032 at the desired location relative to the car body 1002 during the teaching mode. The teach controls 1050 as well as the record button 340, the weld switch 1058 and the conveyor sync switch 1060 are preferably contained in a portable teach control assembly which is interconnected with the cabinet of the manipulator apparatus by means of a flexible cable so that the operator can move to any desired position during the teaching operation and control the recording steps remotely, as described in more detail in said Dunne, et al. application hereinafter.

When the arm has been precisely positioned in each axis and the desired auxiliary functions described above, as well as any desired options, have been set up in the transfer control apparatus 368, the record button 340 is depressed and all of the encoder output signals, auxiliary signals and option signals are transferred in parallel to the 80 bit shift register 366. When this transfer is completed, a signal is supplied to an input gate circuit 370 which permits shift pulses to be applied to the eighty bit shift register 366 so that the digital information which has been transferred to the register 366 is serially supplied through a write amplifier 372 to a particular one of the read heads 350 under the control of a relay selector system 374. Assuming that the selector system 374 is set to supply the recording signal to the first one of the heads 350, the first step in the selected program interval will then be recorded on the memory drum 300. The final output from the shift register 366 is then supplied over the conductor 376 to turn off the gate 370. The end of register pulse is also supplied to the selector system 374 so as to cause the write amplifier 372 to be connected to the next one of the heads 350. The conveyor 1000 is then moved one inch forward so that the car body 1002 is displaced one inch from its previous position and the teach controls are again selectively actuated to bring the weld gun 1029 to a new position relative to the car body 1002 so that new digital information is available from each encoder. This information is again recorded as the second step in the selected program by depressing the record button 340.

During the programming of the manipulator arm the conveyor 1000 may be moved in the desired 1 inch increments by any suitable means. For example, if the conveyor system is of the type in which the coupled car body carriers 1006 are mounted on wheels which move along fixed conveyor rails, an individual carrier 1006 may simply be positioned with the arm 1008 thereof in engagement with the block 1014 when this block is positioned against the stop 1018 and the carrier 1006 may be manually moved one inch ahead to the first position at which the manipulator arm is to be programmed in relation to the car body 1002. The conveyor 1106 may thus be manually moved in successive 1 inch increments and any suitable measuring arrangement may be employed to indicate the desired incremental positions of the carrier 1006.

In the alternative, the arrangement shown in FIG. 9 may be employed to step the conveyor 1000 in 1 inch increments, the manipulator arm being programmed to the desired position on the car body after the conveyor has been moved ahead 1 inch and while the car body is standing still. Thus, referring to FIG. 9 a conveyor drive motor 1062 is provided which is connected through a gear reduction box 1064 to a drive sprocket 1066 which moves the conveyor 1000 through a chain drive 1068. A commutator 1070 is mounted on the output shaft 1072 of the gear reduction box 1064, the commutator 1070 being provided with a series of conductive commutator segments 1074 which are separated by insulation and are electrically connected to a slip ring contact 1076 which rides on the shaft 1072. A commutator brush 1078 is arranged sequentially to contact the segments 1074 as the commutator 1070 is moved.

Considering the operation of the conveyor step drive arrangement shown in FIG. 9, and assuming that the brush 1078 is in between the conductive segments 1074, a start button 1080 is closed so that a starter relay 1082 is energized and the contacts 1083 and 1084 thereof are closed so as to apply line power to the motor 1062. The output shaft 1072 then starts to move and the brush 1078 moves into engagement with one of the segments 1074. When this occurs a holding circuit is closed through the commutator 1070, and the slip ring 1076 so that the start button 1080 may be released. The motor 1062 remains energized until the brush 1078 moves out of engagement with the conductive segment 1074 at which time the relay 1082 is de-energized and the motor stops. The gear reduction box 1064 and the drive chain arrangement 1068 which connects to the conveyor 1000 are arranged so that the resultant movement of the conveyor 1000 during energization of the motor 1062 is 1 inch.

A jog-run switch 1086 is positioned in the jog position during the above-described inching movement of the conveyor 1000. After the manipulator arm has been programmed relative to the car body 1002 at the new position of the conveyor 1000 the start button 1080 is again depressed and released so that the conveyor 1000 is moved ahead another inch. The manipulator arm is again positioned to the desired point on the car body 1002 after which the conveyor 1000 is again moved forward 1 inch by depression of the start button 1080.

After the entire programming operation has been completed, the jog-run switch 1086 may be thrown to the run position in which position the relay 1082 is energized by closure of the start button 1080 and the holding contacts 1088 of the relay 1082 are closed so that the motor 1062 is continuously energized. The conveyor 1000 then continues to run until a stop button 1090 is depressed which opens the hold circuit including the contacts 1088 and de-energizes the relay 1082. In the alternative, any other suitable arrangement may be employed for driving the conveyor 1000 continuously at the desired speed during the performance of the desired spot welding operations on the car bodies 1002. In this connection it will be understood that the conveyor drive arrangement of FIG. 9 may be employed during the programming operation to drive a lightweight conveyor carrying a lightweight mockup of a particular car body on which a desired series of spot welding operations is to be performed. Under such circumstances, the lightweight mockup may be accurately moved in 1 inch increments and stopped to permit programming of the manipulator arm at each 1 inch position of the conveyor whereas with a fully loaded conveyor line it could be difficult to move and stop the conveyor accurately at the desired 1 inch positions during the programming operation.

It is also contemplated that the programming of several manipulators which are to perform several groups of spot welding operations on a given car body may be accomplished at a separate programming station at which the conveyor drive arrangement of FIG. 9, or any other suitable conveyor inching arrangement may be employed in conjunction with a lightweight mockup of a particular car body which is to be thereafter run on the main conveyor line. The programs necessary to perform different series of spot welding operations may then be sequentially established during successive movements of the conveyor past the manipulator programming station. These successively produced programs may be individually stored in any suitable storage arrangement and may be utilized by the different program manipulators along the main conveyor line to carry out the desired series of spot welding programs to accomplish all of the desired spot welding operations on car bodies corresponding to that particular mockup. In the alternative, each program manipulator may be positioned at the mockup programming station and may be programmed to carry out a series of spot welding operations on the mockup after which the completely programmed manipulators may be moved to desired points along the main conveyor line and indexed relative to the posts 1018 so as to carry out the desired series of spot welding operations on similar car bodies which are carried by the continuously moving main conveyor line 1000.

Considering further the manner in which the manipulator 1004 may be programmed in accordance with the above-described simulated continuous path mode of operation of the manipulator, reference may be had to FIG. 2 wherein the programming of a series of manipulator arm positions relative to an inclined strip portion 1092 of the car body 1002 is shown. In FIG. 2 the car body is illustrated as moving in the direction of the arrow 1094 and the strip portion 1092 is inclined at an angle to this direction of motion. The points at which spot welds are to be made on the strip 1092 is shown by the x marks 1096 and 1098, these marks being spaced several inches apart along the strip 1092 and being conveniently made by simple chalk marks on the car body 1002. In order to assist in the programming of the manipulator arm in correlation with the ultimate continuous movement of the conveyor, the distance between the spot welds marks 1096 and 1098 is broken up into a number of substantially equal increments by means of the chalk marks 1100 which may be simply in the form of chalk dots on the strip portion 1092 of the car body 1002.

The welding electrodes 1030, 1032 of the manipulator arm are initially positioned as shown in FIG. 2 outside the path of the car body 1002 and this position 1101 is recorded as the first program step together with a WX signal. The car body is also moved to a position in which the carrier arm 1008 is just ready to move the block 1014 away from the stop 1018, the corresponding position of the strip portion 1092 being shown in full lines in FIG. 2. The conveyor 1000 is then moved forward one inch to the position shown in partially dotted lines at 1102 in FIG. 2 and the manipulator arm is moved to the position shown at 1104 in FIG. 2 by operation of the teach controls 1050 in the manner described heretofore. Welding electrodes 1030, 1032 are positioned immediately over the x mark 1098 and the welding switch 1058 is also thrown to the ON position. The conveyor sync switch 1060 is also thrown to the ON position so that the second program step includes a weld signal and a conveyor sync signal as well as the outputs of the five encoders connected to the five controlled axes of the manipulator and the conveyor encoder 1028. After this information has been recorded as the second program step the conveyor 1000 is moved 1 inch ahead to the position shown in partially dotted lines at 1106 in FIG. 2. Since a weld signal has been programmed at the manipulator position 1104 it is necessary to program the manipulator arm so that it will move in synchronism with the conveyor during the period of time when the welding electrodes 1030, 1032 are in engagement with the car body. In other words, the manipulator arm should move only in the direction of the arrow 1094 during the entire period when the welding electrodes are in engagement with the car body. To this end the manipulator arm is moved to the position shown at 1108 in FIG. 2 and this position of the manipulator arm is recorded as the third programmed step. The weld switch 1058 may be thrown to the off position at this third programmed step since the weld gun control circuit, once initiated, functions to complete the weld independently of the control signal received from the manipulator 1004. However, the conveyor sync switch 1060 remains in the ON position on the third programmed step in order to maintain the above-described self-correcting action of manipulator arm movement relative to the conveyor 1000 on playback The conveyor is then moved to the position shown at 1110 in FIG. 2 and the manipulator arm is moved to the position shown at 1112 and this position is recorded as the fourth program step after which the conveyor is moved to the position 1114 and the manipulator arm is moved to the position 1116 and this position is recorded as the fifth programmed step. The programming of the manipulator arm along a line corresponding to conveyor movement is continued for a number of inch increments corresponding to the total time that the welding electrodes 1030, 1032 will be in engagement with the car body during a spot weld operation. In the illustrated embodiment it is assumed that the conveyor 1000 moves at a speed of 4 inches per second during playback and that the weld gun electrodes remain closed for six-tenths of a second. This means that the welding electrodes will remain closed for approximately 2.4 inches of travel of the conveyor, i.e., the point indicated by the dot 1118 in FIG. 2 on playback. The programming operator need only remember that three inches of movement along the line 1084 are sufficient to insure that the manipulator arm will be moved in synchronism with the conveyor during the spot weld operation.

Since the spot weld operation has been terminated by the time the conveyor is moved to the position 1114 in FIG. 2, the manipulator arm may now be programmed to move toward the next spot weld position 1096 during the next series of program steps. Accordingly, the conveyor is moved 1 inch ahead to the position shown at 1120 in FIG. 2 and the manipulator arm is moved to the position shown at 1122 wherein the weld electrodes are in coincidence with the first one of the chalk marks 1100 on the strip 1092. The manipulator arm position 1122 is then recorded as the next program step.

The conveyor sync switch 1060 remains in the ON position during the entire programming of the manipulator arm over the desired work path relative to the car body 1002. The conveyor is thus moved successively to the positions shown at 1124, 1126 and 1128 in FIG. 2, while at the same time the manipulator arm is moved to the successive positions 1130, 1132 and 1134 and these manipulator arm positions are recorded as successive program steps.

When the manipulator arm position 1134 is recorded a weld signal is also recorded by closure of the switch 1058 so that another spot weld will be performed in coincidence with the x mark 1096 on the strip 1092. In the next three incremental positions of the conveyor 1000 the manipulator arm will be programmed for movement along the line 1094 during engagement of the welding electrodes with the car body in the same manner as the programming of the manipulator arm 1108, 1112 and 1116 described heretofore.

During playback the conveyor 1000 is moved at a continuous fixed rate of speed along the line 1094 and due to the above-described incremental programming of the manipulator arm in the manner shown in FIG. 2 it will be evident that the welding electrodes move along a predetermined work path in relation to the continuously moving car body and effect the desired series of spot weld operations thereon.

In this connection it will be understood that considerably more complex spot welding operations may be programmed in the manner described above in connection with FIG. 2 so that spot weld operations along a curved path, and the like, may be rapidly performed on the moving car body in accordance with the present invention.

Figure 5:
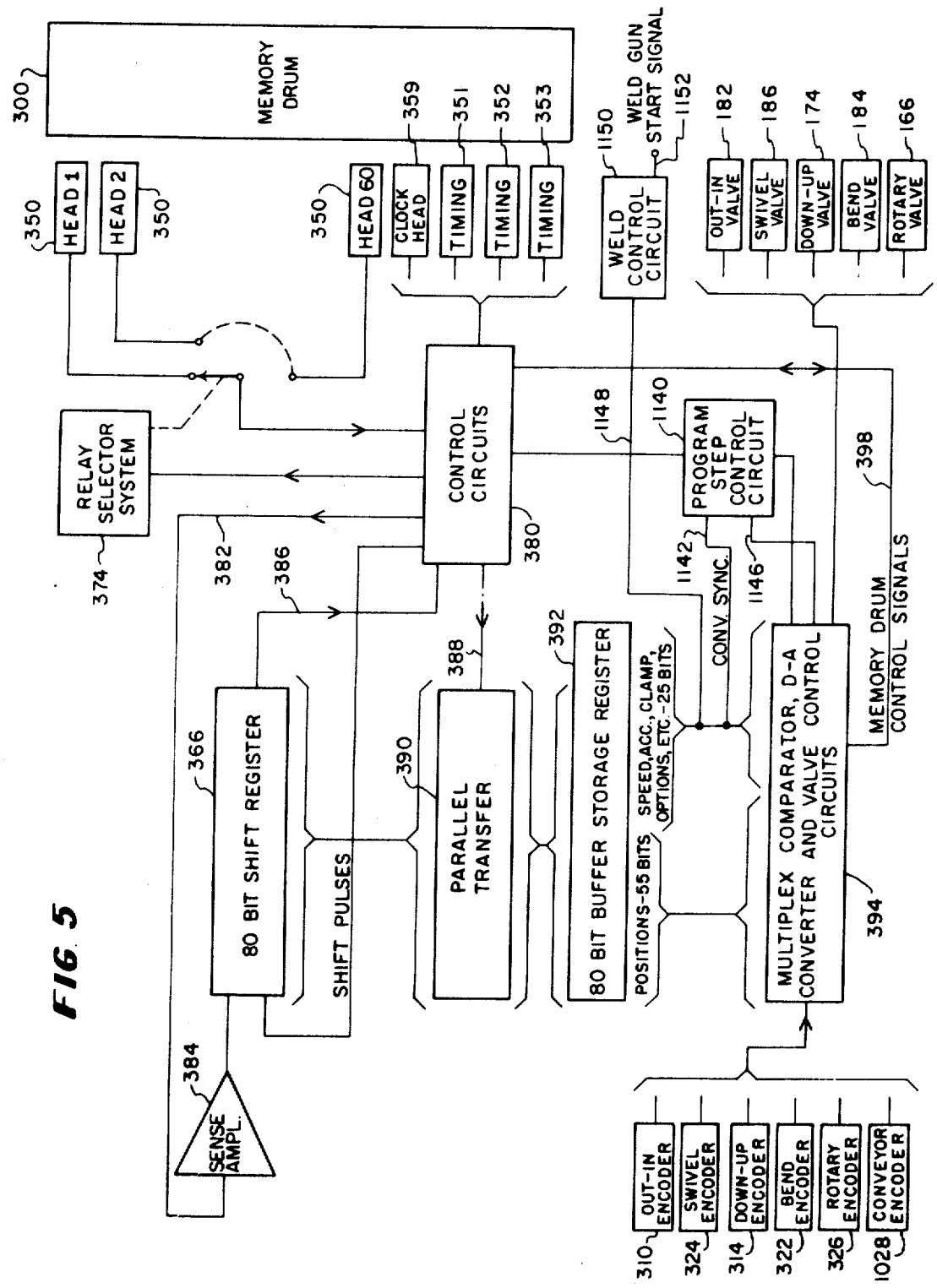
FIG. 5 is a basic block diagram of the control system of the fixed base manipulator of FIG. 1 when operated in the repeat or playback mode.

In FIG. 5 the operation of the manipulator apparatus in the repeat mode of operation is shown in more detailed block diagram form. Referring to this figure, it is assumed that the relay selector system 374 is connected to the first one of the heads 350 which is used as a read head during the repeat operation. The output of this head is sent to a group of control circuits indicated generally at 380 wherein the block and word tracks are employed to select the desired program interval and the programmed bits of information corresponding to the first recorded step of the selected program. These programmed bits are supplied over the conductor 382 to a sense amplifier 384 from which they are supplied to the 80 bit shift register 366. After the first program step information has been read into the register 366 a signal is supplied over the conductor 386 to the control circuits 380 which respond by sending a control signal over the conductor 388 to a parallel transfer circuit 390 which is interconnected between the 80 bit shift register 366 and an 80 bit buffer storage register 392 on an individual basis for each bit. Parallel transfer circuit 390 then transfers the 80 bits of information in parallel to the 80 bit buffer storage register 392 wherein they are stored until the arm and hand assembly has been moved to the position designated by the position signals stored therein. The position signals stored in the register 392 and representing the desired end points of the program step in each of the five axes and the desired position of the conveyor 1000, are supplied to a multiplex form of comparing arrangement indicated generally at 394 wherein the encoder signal is compared with the digital command or position signal stored in the register 392 and develops a digital error signal. This digital error signal is converted to an analog voltage which is then demultiplexed and stored both as to direction and distance, these stored signals then being supplied to the individual servo valves corresponding to each axis. The respective servo valves then function to move the corresponding hydraulic cylinder so that the encoders are moved in the direction to reduce the error signal to zero or some predetermined value in each axis.

While this motion is taking place, the relay selector system 374 is shifted to the next read head 350 and the second step information is read into the shift register 366. When total coincidence is achieved in all five axes, a signal is developed on the conductor 396 which is supplied to the program step control circuit 1140. If no conveyor sync signal has been programmed at that step, this total coincidence signal passes through the circuit 1140 and is supplied to the control circuits 380 which respond by sending a control signal to the parallel transfer circuits 390 over the conductor 388. The parallel transfer circuits 390 then transfer in parallel the eighty bits of information from the shift register 366 to the buffer storage register 392. The information thus stored in the register 392 becomes the new command signals for controlling the servo systems in each axis. At the same time, the relay system 374 is stepped to the next head 350 and the third step information is read into the shift register 366.

If a conveyor sync signal has been programmed at the first step, a conveyor sync signal is transmitted over the conductor 1142 from the register 392 and the control circuit 1140 responds to this sync signal and a signal supplied from the digital-to-analog converter of comparing arrangement 394 over the conductor 1146 by developing a program step control signal when the conveyor encoder signal from the encoder 1028 reaches a value approximately corresponding to the programmed conveyor command signal corresponding to one of the conveyor programming positions 1102, 1106, 1110, etc. shown in FIG. 2. This program step control signal is supplied to the control circuits 380 which respond by shifting to the next program step.

As described in more detail hereinafter, the program step control signal is preferably developed prior to complete coincidence of the conveyor encoder signal with the conveyor command signal, so that a substantial error signal will still be present in the controlled axes of the manipulator when the change to the next program step is made. In this manner, the manipulator arm actuators receive continuously varying velocity signals which integrate out to a resultant movement in synchronism with the continuously moving conveyor 1000.

The weld gun 1029 is thus sequentially moved to the respective positions which have been programmed into the memory drum during the teaching operation. When a program step is encountered which includes an end of program bit, this information is supplied to the control circuit 380 over the conductor 398 which respond by resetting the relay selector system 374 to the first programmed step, as well as performing other auxiliary control functions necessary to repeat the recorded program.

When a program step is sensed which includes a programmed weld signal, a weld control signal is supplied from the register 392 over the conductor 1148 to a weld control circuit 1150 which responds by developing a weld gun start signal on the conductor 1152 which is supplied to the electrical control circuits associated with the welding gun 1029 so that the electrodes 1030, 1032 are closed and a welding cycle is initiated.

Figure 6:
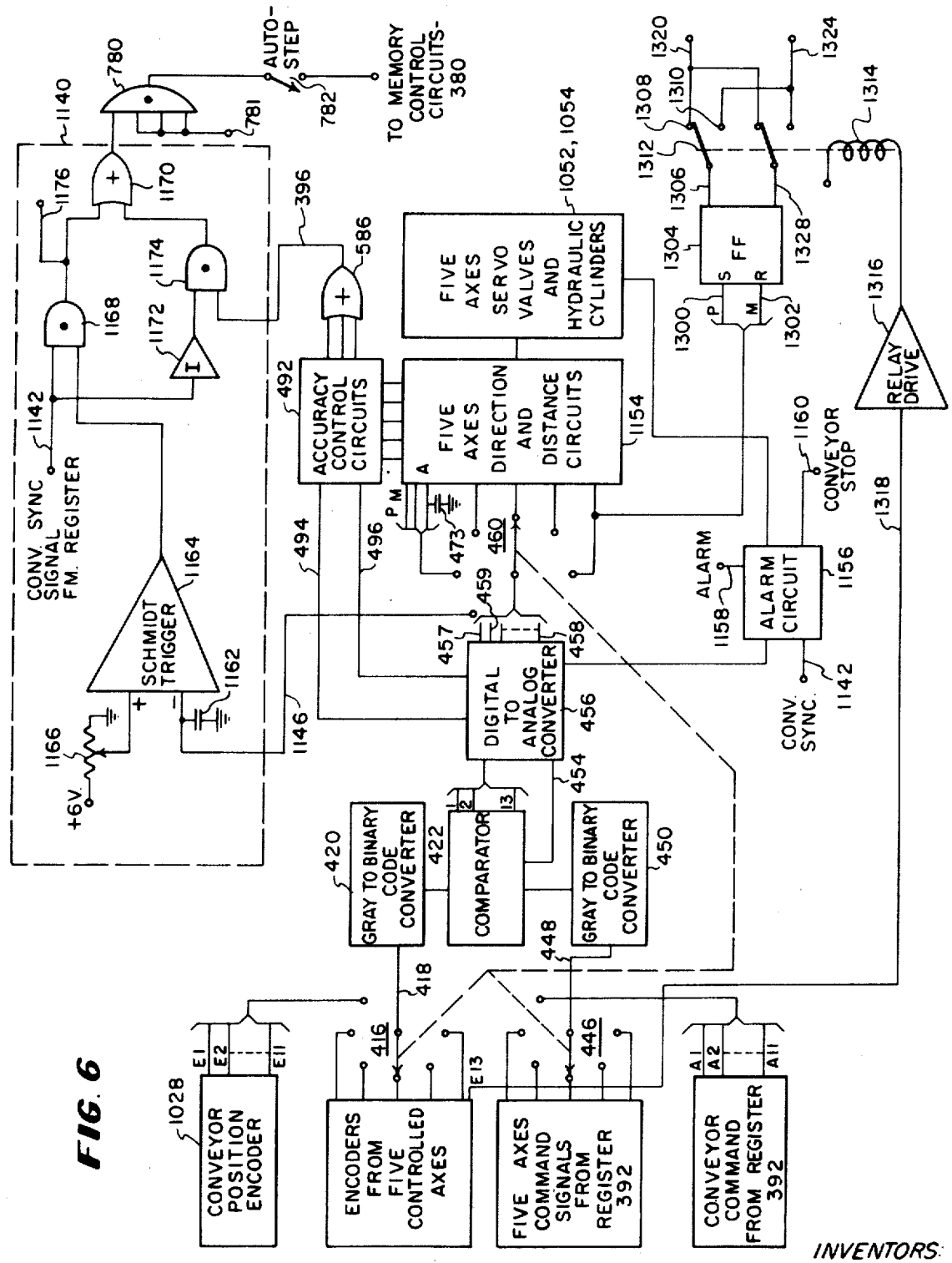
FIG. 6 is a more detailed block diagram of the control system portion of FIG. 5.

Referring now to FIG. 6, the multiplex arrangement is therein shown in block diagram form whereby the encoder signal and memory drum command signal corresponding to each controlled axis and movement of the conveyor 1000 are sequentially compared while employing only a single digital to analog converter the output of which is successively distributed to direction and distance control circuits corresponding to each controlled axis and to the program step control circuit 1140. More particularly, the outputs from the five encoders 310, 324, 314, 322 and 326, and the output from the conveyor encoder 1028 are supplied respectively to the six terminals of a multi-level scanning or multiplexing switch indicated generally at 416, the switch 416 being continuously rotating so that the outputs from these six encoders are sequentially supplied to the common conductors 418 of the switch and to the input of a Gray to binary code converter 420. The output of the converter 420 is supplied to a comparator indicated generally at 422.

The command signals derived from the buffer storage register 392 corresponding to the five controlled axes and the conveyor position command signal are supplied respectively to the six contacts of a multi-level scanning switch which is indicated generally at 446 and is driven in synchronism with the switch 416 by a suitable scanning drive arrangement. As a result, the digital output corresponding to each command signal is sequentially supplied to the common conductors 448 of the switch 446 which are connected to the input of a Gray to binary code converter 450 the output of which is supplied to the other input of the comparator 422.

The comparator 422 must compare the binary encoder signal with the binary command signal and develop a binary error signal representing in digital form the difference between these two numbers. However, it is also necessary to determine the direction in which the controlled axis must be moved since the actual position of the controlled part may be in two positions, one on either side of the command position and still give the same magnitude of error signal. The comparator 422 performs the mathematical function of subtraction by complementary addition in which a thirteen digit error signal is developed on the output conductors S1, S2–S13 and in addition a final carry signal is developed on the conductor 454 which is employed to detect the direction of the desired movement.

The output signals on the conductors S1, S2–S13 will change during the period when the scanning switches 416 and 446 remain connected to a particular axis due to the fact that the encoder signal will be continuously varying as the controlled part is moved in that axis in response to the movement of the corresponding hydraulic cylinder to reduce the error. Also, the outputs on the conductors S1, S2–S13 and the final carry conductor 454 will change to a new set of error signals and final carry signals each time the scanning switches are moved to a different controlled axis. In this connection it will be understood that the scanning switches 416 and 446 are preferably of the type which maintain connections to one set of contacts, for a predetermined interval of time and then are immediately switched to the next set of contacts. In the alternative, electronic switching may be employed as described in detail in said Dunne, et al. application Ser. No. 64,802.

The total scanning cycle time of the scanning switches 416 and 446 is preferably in the order of 1.2 milliseconds during which period each of the six control signals is supplied to the comparator 422 for a duration of approximately 200 microseconds. The 13 digit error signal is supplied from the comparator 422 to a digital to analog converter 456 wherein it is converted to a corresponding analog signal. Since the comparator output signal is continuously changing as the inputs thereto are switched to the five different control axes and the conveyor control, the output of the digital to analog converter 456 will also change for each multiplex channel. However, the analog signal developed on the output conductor 458 of the digital to analog converter 456 is distributed by means of a scanning switch indicated generally at 460 to six contacts corresponding to the five controlled axes and the conveyor sync control. In addition, a positive direction signal developed on the conductor 457, or a negative direction signal developed on the conductor 459, is also distributed by the switch 460 to each set of circuits associated with each controlled axis.

More particularly, the direction and distance control circuits are connected to five of the terminals of the switch 460 and the program step control circuit 1140 is connected to the sixth terminal by way of the conductor 1146. As described in said Dunne, et al. application Ser. No. 64,802 a storage capacitor 473 is connected from the conductor A to ground, so that a voltage is developed across the capacitor 473 which is equal in amplitude to the error signal produced when the comparator 422 is connected to the encoder and command signals corresponding to one controlled axis. As a result, the voltage across the capacitor 473 represents the stored distance to which this controlled axis is to be moved to reach the desired end point. The direction and distance signals stored in the circuits 1154 are individually supplied to the servo valves associated with the five controlled axes and these valves in turn control the hydraulic actuators associated therewith so as to move the welding gun in the desired direction to reduce the error signal to zero.

While the switch 460 has been illustrated as controlled by the same scanner drive which controls the switches 416 and 446, when an electronic scanning system is employed the distribution intervals of the switch 460 are preferably made only during the last half of each multiplex interval, as described in more detail in said Dunne, et al. application Ser. No. 64,802.

When all digits of the binary error signal down to the least significant digit S1 become zero, no signal is produced on either the plus or minus conductors 457, 459. Accordingly, a signal is produced in each of the circuits 1154 which represents completion of the commanded movement in a particular axis. These completion signals are transmitted by separate conductors to a group of control circuits identified as accuracy control circuits 492. Upon coincidence of completion signals on all of these conductors, a total coincidence signal is developed on the output conductor 396 which is supplied to the program step control circuit 1140. In addition, two other accuracy control signals are developed in the digital to analog converter 456 and supplied by way of the conductors 494 and 496 to the accuracy control circuits 492 so that three different accuracy signals are available for control as described in more detail in said Dunne, et al. application Ser. No. 64,802.

In accordance with a further feature of the invention, the various disclosed embodiments preferably include an alarm circuit 1156 which receives the multiplex error signals developed by the digital-to-analog converter 456 and produces an alarm signal at the output 1158. In addition, the alarm circuit 1156 is arranged to disable the hydraulic actuators 1054 and also supplies a control signal over the conductor 1160 to the main conveyor drive circuit so as to stop the conveyor, as will be described in more detail hereinafter in connection with FIG. 7.

Considering now the program step control circuit 1140, it will be recalled that a conveyor sync signal is programmed at each step which is to be controlled by the position of the conveyor encoder 1028 rather than by one of the three coincidence signals developed on the conductor 396 in accordance with the particular accuracy setting of the switch 385 for that position. The signal appearing on the conductor 1146 during the sixth multiplex period corresponds to the analog error signal resulting from a comparison of the conveyor encoder 1028 and its corresponding command signal from the register 392 and is stored in a capacitor 1162. The stored conveyor error signal across the capacitor 1162 is supplied as one input of a Schmidt trigger circuit 1164 the other input of which is the arm of a potentiometer 1166 connected between ground and plus 6 volts. Accordingly, when the amplitude of the error signal across the capacitor 1162 becomes smaller than the voltage at the arm of the potentiometer 1166 the circuit 1164 produces an output signal which is supplied as one input of a two input AND-gate 1168.

Assuming that the particular program step under consideration has been programmed with an accompanying conveyor sync signal, thereby indicating that conveyor position is to control stepping of the memory drum to the next program step, a signal will be developed on the conductor 1142 which is supplied as the other input of the AND-gate 1168. Accordingly, when the circuit 1164 supplies an enabling signal to the other input of the AND-gate 1168 this AND-gate responds by producing an output signal which is supplied through an OR-gate 1170 to the master AND-gate 780. As described in the above-identified copending Dunne, et al. application Ser. No. 64,802 a number of other signals may be supplied to the AND-gate such as "Wait External" signals and other options, and when all of these enabling signals have been completed, an output is developed by the AND-gate 780 which is supplied through the auto-step switch 782 to the memory control circuits 380 which function to shift the memory drum to the next program step.

The potentiometer 1166 may be adjusted to control the point at which a shift to the next program step is made. For example, the potentiometer 1166 may be adjusted so that a shift to the next program step is made when the conveyor is ¼ inch away from the point of total coincidence as indicated by the programmed conveyor command signal. Accordingly, the shift to the next program step will be made while substantial error signals still exist in the five controlled axes of the manipulator 1004 so that the manipulator arm never reaches the position corresponding to one program step before a shift is made to the next program step with the result that a continuous error signal of varying magnitude is supplied to the servo valves of the five controlled axes of the manipulator. The adjustment of the potentiometer 1166 can be correlated with a particular conveyor speed so as to produce a substantial synchronous movement of the welding gun 1029 relative to the moving car body. Furthermore, it is possible to correlate different conveyor speeds with different settings of the potentiometer 1166 so that substantial synchronous movement of the manipulator arm can be obtained with different conveyor speeds.

In the event that the conveyor speed is not constant, as, for example, when excessive slack between carriers causes uneven motion of the workpiece, compensation can be made by varying the potential supply connected to the potentiometer 1166. Thus, the output of a tachometer generator can be connected in series with the left hand terminal of the potentiometer 1166 to the plus 6 volt supply. This generator would be driven from the same shaft 1027 as the conveyor encoder 1028 and would develop a small voltage, in the order of 1 volt, when the conveyor is moving at the desired speed. This compensation voltage is added to the plus 6 volt supply voltage and the potentiometer 1166 would be adjusted to give the desired lead time in changing from one program step to the next. However, if the speed of the conveyor changes the voltage developed by this generator would change correspondingly and make an appropriate adjustment in lead time so that synchronous movement with the conveyor is maintained. If no conveyor sync signal is present at a particular programmed step, the circuit 1140 responds by producing a total coincidence signal only when movement in the five controlled axes has been completed to the desired accuracy. More particularly, if no signal is present on the conductor 1142, the AND-gate 1168 is not enabled and a signal is supplied through an inverter 1172 to one input of a two-input AND-gate 1174. The other input of the AND-gate 1174 is supplied from the accuracy control circuits 492 through the OR-gate 586. Accordingly, when total coincidence is achieved in all five axes to the desired accuracy, a signal is developed on the conductor 396 which passes through the AND-gate 1174 and the OR-gate 1170 to the master AND-gate 780 so that a shift from one program step to the next is accomplished in the conventional manner, as described in detail in said Dunne, et al. application Ser. No. 64,802. Accordingly, gross motions of the manipulator arm may be accomplished with a minimum of program steps as, for example, when the manipulator arm is returned to the initial position shown in FIG. 2 after the complete spot welding operation has been completed.

Considering now the weld control circuit 1150 shown in FIG. 7, it will be recalled that a weld signal is derived from the register 392 by way of the conductor 1148 whenever a program step is encountered at which a spot weld should be performed on the car body 1002 by the welding gun 1029. However, the spot weld should not be performed until the manipulator arm has reached the position indicated by the command signals accompanying the weld signal. On the other hand, the welding electrodes 1030, 1032 require a certain amount of time to close upon the work after a weld start signal is produced.

While each position at which a weld is to be made could be indicated by a duplicate program step with an accompanying weld signal, such an arrangement would require a considerable number of additional program steps. In accordance with a further feature of the invention, the welding gun start signal is not produced until a program step shift signal is produced by the circuit 1140, this signal being produced just slightly ahead of total coincidence between the conveyor encoder signal and the corresponding conveyor encoder command signal. More particularly, the output of the AND-gate 1168 in the circuit 1140 is supplied over the conductor 1176 to one input of a two-input AND-gate 1178, to the other input of which is supplied the weld signal developed on the conductor 1148 by the register 392. Accordingly, when the conveyor is almost at a position at which a weld is to be made, i.e., is almost to the position 1128 shown in FIG. 2, for example, the AND-gate 1178 produces an output which is amplified in a relay driver circuit 1180 and energizes a weld signal relay 1182 so that the normally open contacts 1184 and 1186 thereof are closed. When the contacts 1186 are closed, a control signal is supplied to the weld gun control relay associated with the welding gun 1029, so that the electrodes 1030, 1032 are closed upon the workpiece. Also, a holding circuit is set up through contacts 1184 and the contacts 1188 which are controlled by the weld gun limit switch associated with the movable welding electrode 1032, as described in more detail in Dunne, et al. application Ser. No. 50,441. The contacts 1188 are closed as soon as the welding electrodes are clamped to the work and do not open until the welding cycle is over and the electrode 1032 is retracted. Accordingly, the weld signal relay 1182 remains energized in response to the weld signal programmed at a given program step even though the actual welding time lasts for a period of time corresponding to several program steps. However, as soon as the weld is completed and the electrode 1032 is retracted, the contacts 1188 are opened and the holding circuit for the relay 1182 is broken so that this relay is de-energized.

Referring now to the alarm circuit 1156, which is also shown in FIG. 7, it will be recalled that this alarm circuit is provided for the purpose of shutting down the conveyor line and producing an alarm signal if the conveyor and manipulator arm become grossly out of synchronism. In addition, the alarm circuit 1156 may be arranged to disable the hydraulic actuators which control the welding gun 1029 in five axes so that the manipulator arm in effect will go limp and can be dragged along with the conveyor line in the event that the electrodes 1030, 1032 are clamped to or are in interference with the work at the time that the alarm signal occurs. Accordingly, if power to the manipulator 1004 is interrupted for any reason, and the manipulator arm stops while the conveyor goes on, the alarm circuit 1156 functions to shut down the conveyor and disable the manipulator arm actuators before substantial damage is done to either the manipulator or the main conveyor. More particularly, the outputs from the comparator 422 representing the two most significant digits are transmitted through an OR-gate 500 and constitute one input signal for the alarm circuit 1156, the other input signal being developed across the common ladder resistor 594 of the digital-to-analog converter 456. As described in detail in Dunne, et al. application Ser. No. 64,802, these signals may be compared with a reference signal to develop a signal whenever the error signal exceeds a maximum error value. Such an arrangement is used, for example, in the accuracy 2 and accuracy 3 circuits described in detail in said copending Dunne, et al. application. Thus, a voltage on the conductor 842 is supplied through a summing resistor 1200 to the input of a voltage crossing detector or modified Schmidt trigger circuit comprising the transistors 1202 and 1204, the resistor 1200 being connected to the base of the transistor 1202. In a similar manner the output conductor 604 of the ladder network described in said Dunne, et al. application is supplied through a summing resistor 1206 to the base of the transistor 1202. The arm of a potentiometer 1208 is likewise supplied through a summing resistor 1210 to the base of the transistor 1202, this potentiometer being connected between ground and a plus 6 volts reference source. The emitters of the transistors 1202 and 1204 are connected through a common resistor 1212 to a positive voltage supply and the collectors of these resistors are connected through the resistors.

The summing resistors 1200, 1206 and 1210 function to take the algebraic sum of the signals appearing on the conductors 842 and 604 and the voltage at the arm of the potentiometer 1208. Furthermore, the voltages present on the conductors 842 and 604 represent in analog form the difference between the programmed position of the manipulator arm in all five axes and the programmed position of the conveyor 1000, and the actual position of the manipulator arm and conveyor. Accordingly, by setting the arm of the potentiometer 1208 to any desired value, an output can be produced by the trigger circuit 1202, 1204 whenever the error voltage becomes larger than a predetermined value as determined by the potentiometer 1208. Since the manipulator arm is normally programmed for relatively short increments of travel corresponding to the one inch increments of movement of the conveyor 1000 the error voltage should never be very large under normal operating conditions. Accordingly, the potentiometer 1208 can be set to correspond to an error signal equal to a difference between encoder and command signals in any axis of, for example, 8 to 10 inches. Under these conditions, if the error signal increases to this amount, for any reason, the trigger circuits 1202, 1204 develop an output signal which is supplied as the one input signal to a two input AND-gate 1214. The other input of the AND-gate 1214 is the conveyor sync signal from the register 392 which appears on the conductor 1142. Accordingly, the AND-gate 1214 does not develop an output unless a corresponding conveyor sync signal appears on the conductor 1142. This is done so that the alarm circuit will not sound an alarm and stop the conveyor during periods when the conveyor sync signal is not present, i.e., during periods when the manipulator is moved in large amounts in response to a single command, such as when it is being returned to its initial position at the end of the welding cycle.

If a conveyor sync signal is present on the conductor 1142 an indication is provided that the manipulator arm is supposed to be closely following the conveyor 1000 and AND-gate 1214 produces an output if the maximum error established by the setting of the potentiometer 1204 is exceeded. The output of the AND-gate 1214 is supplied to a flip-flop circuit 1216 which is set by this AND-gate output and actuates a relay driver circuit 1218 which controls an alarm relay 1220. The alarm relay 1220 is normally energized so that the contacts 1222 thereof are open under normal operating conditions. However, when the predetermined maximum error signal is developed and the flip-flop circuit 1216 is actuated the alarm relay 1220 is controlled so that the contacts 1222 thereof is closed. Closure of the contacts 1222 is employed to disable the main conveyor drive system so that the conveyor 1000 comes to a halt. The alarm relay 1220 may be returned to its normal position by pushing an alarm reset button 1217 which resets the flip-flop 1216 to its initial condition after the maximum error signal condition is rectified.

It will be noted that the alarm circuit 1156 is sensitive not only to a maximum error between any of the five encoders controlling the five axes of the manipulator arm, but is also sensitive to a maximum error between the conveyor command signal and the output of the conveyor encoder 1028. This is because the comparator 422 senses all six encoders during one multiplex cycle and all of these six comparator signals are supplied to the main ladder network, as described in detail in said Dunne, et al. application Ser. No. 64,802. Accordingly, if the conveyor chain driving the encoder 1028 breaks while the conveyor 1000 continues to move, a maximum error signal will quickly be generated during the multiplex period assigned to the conveyor encoder and an alarm signal will be generated which results in shutting down the conveyor.

Since the conveyor may take a considerable length of time to coast to a stop and the manipulator arm may be at a point in the spot welding operation at which further movement of the conveyor could seriously damage the manipulator, the alarm relay 1220 is also arranged in accordance with a further feature of the invention to disable all of the hydraulic actuators which control movement of the manipulator arm in the five controlled axes as soon as the alarm signal is developed. This means that while the conveyor is coasting to a stop the manipulator arm becomes limp and is free to move and be carried along by the conveyor. To accomplish this the contacts 1224 of the alarm relay 1220 are connected in series with a group of parallel connected solenoid valves which, when energized, function to equalize the pressure on either side of the associated hydraulic actuator so that the manipulator arm can be moved in response to an external force of relatively small magnitude. More particularly, an out-in solenoid valve 1226, a pair of down-up solenoid valves 1228, a rotary solenoid valve 1230, a wrist bend solenoid valve 1232, and a wrist swivel solenoid valve 1234 are all connected in parallel and through the series relay contacts 1224 to a source of power L1, L2.

It will be recalled that the alarm relay 1220 is normally energized during operating conditions so that the contacts 1224 thereof are closed during normal operation of the manipulator apparatus. However, when an alarm signal is developed and the alarm relay 1220 is de-energized in response to the actuation of the flip-flop circuit 1216, the contacts 1224 are opened so that the above enumerated solenoid valves are all de-energized. As shown more particularly in FIG. 8, these solenoid valves are arranged when de-energized to equalize the pressure on opposite sides of each hydraulic actuator so that the actuators can be moved by external forces. It should be noted that the solenoid valves 1226 to 1234, inclusive, are of the type which function when de-energized so as to fail safe in the event of loss of electrical power to the manipulator apparatus. It should also be noted that in the event the conveyor itself loses electrical power and stops no new command will be produced since the output from the conveyor encoder 1028 will remain constant and coincidence with the conveyor command signal will not be achieved. The manipulator apparatus will simply move to the programmed point corresponding to the last conveyor command signal and stop. Since this is a very short distance no damage to either the manipulator or work will be produced.

Referring to FIG. 8, the hydraulic actuator and their controlling servo valves are shown in this figure with numerals corresponding to those employed in Dunne, et al. application Ser. No. 64,802 and reference may be had to said application for a detailed description of the hydraulic actuator drive arrangement of the manipulator arm. However, in order to simplify FIG. 8, the regulated pressure supply system has been indicated generally as the block 1240 and certain of the relief valves and other non-essential components have been eliminated from the drawing.

Considering first the rotary hydraulic actuator arrangement, a pair of actuators 124 and 126 are interconnected by means of the rack 122 and are arranged to rotate the trunk 60 of the manipulator through the ring gear 120. Normally, the servo valve 166 controls the supply of fluid to either the actuator 124 or 126 so as to move the manipulator arm in the rotary axis to the desired position. The solenoid valve 1230 is connected between the input conduits 168 and 170 which are themselves connected to the outer ends of the actuators 124 and 126. When the solenoid valve 1230 is de-energized in the manner described above by opening of the alarm relay contacts 1224, the two lines 168 and 170 are connected together through the solenoid valve 1230 so that a hydraulic connection is established between the ends volumes of the two actuators. No pressure difference can thereafter exist and oil can freely transfer from one side to the other if the manipulator arm is moved by some external force such as engagement with a workpiece on the conveyor.

The wrist bend actuator 90 and the wrist swivel actuator 100 are controlled in a similar manner by the respective solenoid valves 1232 and 1234. When the alarm relay contacts 1224 are opened the solenoid valves 1232 and 1234 are de-energized and function to connect the opposite sides of the piston in each actuator so that the welding gun 1029 can be freely moved in both wrist bend and wrist swivel axes in response to external forces exerted thereon.

Considering next the down-up actuator 64, this actuator is normally controlled by the servo valve 174 so as to pivot the manipulator arm about a horizontal axis to produce the desired down-up movement thereof. When the down-up solenoid valve 1228a is de-energized by opening of the alarm relay contacts 1224, full system pressure is applied through the conduit 178 to the rod end of the actuator 64. However, since this rod end of the actuator is of smaller area than the piston end of this actuator, which is controlled through the conduit 176, it is necessary to provide a pressure regulator 1242 which is connected in series with the solenoid valve 1228b to the full system pressure line 169. When the solenoid valve 1228b is de-energized by opening of the alarm relay contacts 1224 a reduced pressure is supplied to the conduit 176 and hence to the piston end of the actuator. The pressure regulator 1242 is set to yield a pressure equal to the system pressure times the ratio of the rod end area to the piston end area of the actuator 64 so that a force balance is achieved when the solenoid valves 1228a and 1228b are de-energized. The manipulator arm may then be moved in the down-up axis in response to external forces.

When the out-in solenoid valve 1226 is de-energized by opening of the alarm relay contacts 1224, a pressure is supplied to the piston end of the out-in actuator 72 so as to achieve a force balance between the rod end of this actuator and the piston end thereof. More particularly, full system pressure is normally applied to the rod end of the actuator 72 at all times. When the solenoid valve 1226 is de-energized, system pressure is reduced in a pressure regulator 1244 so that pressure is supplied to the piston end of the out-in actuator 72 in the desired ratio of the rod and piston areas to achieve a force balance.

The pressure regulator 1244 is arranged to provide three different pressures each of these pressures being controlled by means of separate hand adjustment wheels 1246, 1248 and 1250. In the absence of controlling electrical signals, which are supplied in connection with a frictional drag compensation arrangement to be described in more detail hereinafter, the pressure regulator 1242 can be adjusted by the wheel 1248 to provide the above-described reduced pressure so that an exact force balance is achieved between the opposite sides of the piston in the actuator 72.

The pressure regulator 1244 is also arranged to respond to electrical control signals by giving a slightly increased pressure or a slightly decreased pressure which is sufficient to overcome the frictional drag of the actuator 72 for movement of the actuator in either the in or the out direction. This frictional drag compensation arrangement is employed in connection with the limp hand mode of programming described in detail hereinafter in connection with FIGS. 10 and 11.

In order that the servo valves which normally control the hydraulic actuators described heretofore, will also be disabled in response to the alarm signal, the alarm relay 1220 is provided with another set of contacts 1249 which are connected in series from the minus 18 volt supply to the servo amplifiers in the distance circuits 1154. As described in detail in the Dunne, et al. application Ser. No. 64,802 these servo amplifiers normally respond to the error signals distributed thereto by supplying corresponding electrical control signals to the input coils of the respective servo valves. However, when the alarm relay circuit 1120 is de-energized, the contacts 1249 thereof are opened so as to remove the minus 18 volt supply from all five servo amplifiers so that no current is supplied to the input coils of the servo valves 182, 186, 174, 184 and 166 (FIG. 5). When this occurs, all five servo valves return to their neutral position and do not exercise any control function on their resistive hydraulic actuators once an alarm signal is given.

In accordance with a further aspect of the present invention the manipulator arm may be programmed in a different manner than that described above in connection with FIGS. 1 to 9, inclusive so that a considerably smaller number of program steps is required while at the same time achieving the same overall result of cooperation of the manipulator arm with a workpiece on the moving conveyor 1000. This different mode of programming may be called a "limp hand" mode of programming and the arrangement employed to program the manipulator 1004 according to this limp hand mode is shown in FIG. 10 of the drawings.

Referring to FIG. 10, a strip 1252 on the moving car body 1002 is illustrated in FIG. 2 as extending at an angle to the movement of the conveyor 1000 along the arrow 1254. In the limp hand mode of programming, the strip 1252 is marked only with the chalk X marks 1256 and 1258 corresponding to the exact positions at which each spot weld is to be made. It is assumed that the manipulator 1004 is initially precisely positioned beyond the edge of the conveyor 1000 as shown in full lines in FIG. 10 and with the car body 1002 is positioned at the point where the arm 1008 just starts to move the block 1014 away from the stop 1018 this stationary position of the strip 1252 being shown in full lines in FIG. 10.

The manipulator arm is first moved to the position shown in dotted lines at 1260 in FIG. 10 and the car body 1002 is moved forwardly to the position shown in dotted lines at 1262 so that the X mark 1258 is immediately between the points of contact of the welding electrodes 1030 and 1032 with the manipulator arm at position 1260. This movement of the car body may be performed manually or by any suitable auxiliary conveyor drive means whereby the conveyor is moved from the position shown in full lines in FIG. 10 to the position shown at 1262.

When the manipulator arm is in alignment with the chalk mark 1258 on the car body 1002, the record button 340 is pressed while the weld switch 1058 is ON and the conveyor sync switch 1060 is on.

In the limp hand mode of programming the hydraulic actuators of the manipulator arm are disabled so that during the period when the welding electrodes 1030, 1032 are clamped to the workpiece and the conveyor moves in the direction shown by the arrow 1254 the manipulator arm is limp and is simply pulled along by engagement with the moving car body as the spot weld is being made. This action, of course, takes place on playback and is indicated by the arrow 1264 in FIG. 10. On playback, the manipulator arm will be moved from the position 1260 to the position shown in dotted lines at 1266 in FIG. 10 without the programming of any additional steps during the teaching operation. However, in the limp hand mode of programming, control of the manipulator arm is restored to the hydraulic actuators as soon as welding is completed and the arm should be programmed to move to a point slightly ahead of the next weld mark 1256 by the time it arrives at this point, i.e., the position shown in dotted lines at 1268 in FIG. 10. Accordingly, during the teaching or programming operation, the next operation after the first program step is recorded at position 1260 is to move the manipulator arm to the position 1268. the conveyor is then moved from the position 1262 to a position in which the chalk mark 1256 exactly coincides with the welding electrodes 1030, 1032 when the arm is at position 1268. The record button 340 is then depressed to record this position of the manipulator arm and the conveyor as the next program step.

Since the weld marks 1256 and 1258 will normally be several inches apart, the movement of the manipulator arm from the position 1260 to the position 1268 is chosen to be sufficiently great to insure that on playback a weld is made at the mark 1258 and the manipulator arm has time to move to the new position 1268 before the chalk mark point 1256 arrives at the position 1268. It will thus be seen that in the limp hand mode of programming the manipulator arm moves in synchronism with the conveyor 1000 during the period of travel 1264 when the welding electrodes are clamped to the car body. However, as soon as the weld is completed, control is restored to the hydraulic actuators and the manipulator arm moves rapidly to the new position 1268 and waits for the next chalk mark point 1256 to arrive at which time a conveyor sync signal is produced and a new spot weld cycle is initiated.

Since the manipulator arm need not move synchronously with the conveyor between the weld cycles under the limp hand mode of programming, a considerably smaller number of program steps is required to complete a given pattern of spot welds. In this connection, it will be understood that with the simulated continuous path mode of programming it is contemplated that the manipulator arm is programmed continuously to move in synchronism with the conveyor so that in the period when the welding electrodes are clamped to the workpiece, the hydraulic actuators can continue to drive the manipulator arm without damage to the work. However, it is also possible under the continuous path mode of programming to control the hydraulic actuators of the manipulator arm so that these actuators are disabled during the period of the weld and the manipulator arm is simply pulled along by engagement with the workpiece on the conveyor during the actual making of the spot weld. Such an arrangement has the advantage that it is unnecessary to program the manipulator arm at several points during the time the weld is being made and hence eliminates the program steps corresponding to the positions 1108, 1112 and 1116 in FIG. 2. However, the additional circuit arrangements to be described hereinafter in connection with the limp hand mode of operation would then be required for this modified type of continuous path programming of the manipulator arm.

Since the manipulator arm is arranged to be pulled along by engagement of the workpiece on the conveyor during each spot welding operation, it is necessary to disable or de-activate all five hydraulic actuators during each spot weld operation. In accordance with a further feature of the invention, an arrangement is employed which is similar to the above described arrangement for disabling these actuators in response to an alarm signal produced by the alarm circuit 1156. More particularly, the weld signal relay 1182 is provided with an additional set of contacts 1270 which are connected in parallel with the relay contacts 1224 and are normally closed, i.e., are closed during periods when the weld signal relay 1182 is de-energized. However, after the manipulator arm has been moved to a position such as the positions 1260 or 1268 in FIG. 10 and the conveyor has moved to a position where the corresponding chalk mark such as the chalk mark 1258, is just slightly behind the welding electrodes 1030, 1032, a program shift signal is produced on the conductor 1176 in the program step control circuit 1140 which results in energization of the weld relay driver 1180 so that the weld signal relay 1182 is operated and the weld gun control relay contacts 1186 are closed so that the electrodes 1030, 1032 start to engage the work. At this same time the contacts 1270 are open so that all of the solenoid valves 1226 to 1234 are de-energized with the result that a force balance is achieved in all five hydraulic actuators in the manner described in detail heretofore in connection with FIG. 8. Accordingly, as the welding electrodes 1030, 1032 engage the work the hydraulic actuators are rendered inoperative, thus permitting the manipulator arm to be pulled along by engagement of the welding electrodes with the point 1258 on the workpiece. Such action continues until the weld gun limit switch contacts 1188 are opened when the welding electrode 1032 is retracted to the open position at which time the weld signal relay 1182 is de-energized and the contacts 1270 thereof are closed. As soon as the contacts 1270 are closed, all five solenoid valves 1226 to 1234 are energized.

As soon as a signal is produced on the conductor 1176, the memory control circuits 380 function to step to the next program step in the memory drum 300, as described in detail heretofore. Accordingly, as soon as this occurs, the new command signals for the manipulator arm corresponding to the position 1268 are supplied to the comparator 422. Since at the same time the hydraulic actuators are disabled, the arm does not move to the position 1268 during the period when the welding electrodes are in engagement with the workpiece. However, as soon as the welding electrode 1032 is retracted and control is restored to the hydraulic actuators the manipulator arm moves quickly from the position 1266 which it occupied at the end of the first spot weld at point 1258, to the position 1268 and there waits until a pulse is produced on the conductor 1176 when the point 1256 almost coincides with the weld electrodes which are positioned at position 1268 in FIG. 10. A similar spot welding cycle is then initiated in the manner described above during which time the hydraulic actuators are again disabled. It will thus be evident that a considerably smaller number of steps is required for the limp hand mode of programming in accordance with the present invention.

When the hydraulic actuators are disabled during the making of a spot weld as described above in connection with FIG. 10, the manipulator arm is moved by engagement of the welding electrodes 1030, 1032 with the moving car body 1002. However, such movement can result in movement of the manipulator arm in the out-in axis which requires movement of the piston rod 76 of the actuator 72 (FIG. 8). Since this piston is relatively long, and the welding gun 1029 on the end of the arm has substantial weight, a substantial frictional drag is experienced when the rod 76 is moved either in or out.

This frictional drag may be in the order of 50 pounds and under certain conditions the engagement of the welding electrodes with the moving car body might not be able to overcome the frictional drag of the out-in actuator 72 and move the manipulator arm in this axis without bending or damaging the car body. In accordance with a further feature of the invention, a frictional drag compensation arrangement is provided which introduces a force to assist movement of the rod 76 in the out-in actuator 72 in the required direction during periods when spot welds are being made and the hydraulic actuator 72 is disabled.

In this connection, it will be appreciated that this compensation has to be in different directions depending upon the point at which the spot weld is made relative to the fixed base of the manipulator 1004. Thus, referring to FIG. 11, the manipulator arm 1004 is movable through an arc indicated at 1272 in FIG. 11 while the fixed base 1274 of this manipulator remains stationary. It is assumed that the conveyor 1000 is moving in the direction of the arrow 1276 in FIG. 11 and it will be evident that different frictional drag compensations are required for the out-in axis of the manipulator 1004 when spot welds are made at points A and B in FIG. 11. Thus, if a spot weld is to be made at point A the manipulator arm will be moved in the direction of the arrow 1278 during the making of this spot weld which will require a movement of the rod 76 of the out-in actuator 72 in the direction of the arrow 1280. On the other hand, if a spot weld is made at point B the manipulator arm moves in the direction of the arrow 1282 during the making of this spot weld which will require an out movement of the piston rod 76, as indicated by the arrow 1284. It will also be noted that if the conveyor is moving in the opposite direction exactly reverse frictional drag compensations are required. Thus, if the spot weld A is made while the workpiece moves in the direction of the arrow 1286, an out compensation indicated by the arrow 1288 is required, whereas if a spot weld at point B is made while the conveyor moves in the direction of the arrow 1290 an in compensation, indicated by the arrow 1292 is required.

In order to provide automatic frictional drag compensation for all of these differing requirements, the pressure regulator 1244 is arranged to provide either a slightly increased pressure when an out movement of the actuator 72 is required during the making of a spot weld or a slightly decreased pressure when an in movement of the actuator 72 is required, this slight differential pressure being preferably sufficient to equal or slightly overcome the frictional drag of the actuator 72 itself. This slight differential pressure is not sufficient to move the actuator rod 76 itself but simply assists the external force component in the out-in direction when the manipulator arm is being pulled along by engagement of the workpiece on the moving conveyor.

More particularly, the rotary encoder 326 (FIG. 5) may be employed to give an indication that the manipulator arm 1004 is either in the quadrant of movement indicated at 1294 in FIG. 11, i.e., the righthand sector of movement of the manipulator 1004, or the lefthand sector indicated by the arc 1296 in FIG. 11. Since the rotary encoder 326 employs a Gray code, the most significant digit, i.e., the voltage on the conductor E13 of this encoder will comprise a binary "1" signal for the sector of movement 1294 of the arm 1004 and will have a binary zero value for movement of the arm in the arc 1296.

While the signal on the E13 conductor of the rotary encoder 326 could be employed by itself to provide the required frictional drag compensation, such compensation would be made only for conveyor movement in the direction 1276. In order to provide both polarities of frictional drag compensation, the direction of movement while the weld is made is also employed to determine whether a plus frictional drag or minus frictional drag should be exerted on the actuator 72. This is made possible because the next program step is selected as soon as a spot weld is initiated. Thus, referring to FIG. 10, as soon as a spot weld is initiated at position 1260, the manipulator arm position 1268 is presented to the comparator 422. Accordingly, a plus or minus signal is developed in the direction and distance circuits for the rotary axis as soon as a spot weld is initiated.

The plus and minus conductors 1300 and 1302 for the rotary actuator may thus be utilized to detect the direction of movement of the manipulator arm during the period when the spot weld is being made and this indication is employed to control the direction of frictional drag compensation which is pro-vided for the actuator 72. More particularly, if a plus signal for the rotary axis appears on the conductor 1300, a flip-flop 1304 is set so that a signal appears on one output conductor 1306 of this flip-flop. The signal appearing on the conductor 1306 is supplied either to a contact 1308 or a contact 1310 depending upon the position of the switch arm 1312 which is controlled by a quadrant control relay 1314. The relay 1314 is controlled through a relay driver circuit 1316 from the E13 conductor 1318 of the rotary encoder 326 so that the relay 1314 is energized whenever the manipulator arm 1004 is in one of the quadrants 1294, 1296 and is de-energized during periods when this arm is positioned in the other quadrant.

Assuming that the relay 1314 is de-energized, and that this indicates that the manipulator arm is in the quadrant 1296, and assuming further that movement of the conveyor in the direction 1282 corresponds to a plus movement, i.e., a signal on the conductor 1300, the required compensation for the frictional drag of the out-in actuator 72 would be in the out direction, as shown by the arrow 1284 in FIG. 11, so that the flip-flop output signal is supplied from the conductor 1306 by way of the conductor 1320 to a positive increase solenoid valve 1322 (FIG. 8) of the pressure regulator 1244 so that this solenoid valve 1322 is energized. When the solenoid valve 1322 is energized, the pressure regulator 1244 responds by producing a pressure which is slightly increased over the normal value established by the hand wheel 1248, this slightly increased pressure being adjustable by means of the hand wheel 1246. Preferably, this slightly increased pressure is sufficient to partially or completely overcome the frictional drag of the actuator 72 in the out direction 1284 of the manipulator arm so that as the conveyor moves in the direction 1282 an assisting action is provided by this frictional drag compensation to permit movement in the out-in axis along the arrow 1284 without buckling or damaging the workpiece. If, however, the conveyor is moving in the direction 1276 and a plus signal is produced on the conductor 1300 when the manipulator arm is in the quadrant 1294, i.e., when a spot weld at point A is being made, the relay 1314 will be energized, since the E13 conductor has a binary "1" for all positions in the quadrant 1294, so that the signal on the conductor 1306 is supplied through the movable switch contact 1312 to the contact 1310 and over a conductor 1324 to a minus solenoid valve 1326 of the pressure regulator 1244. When the solenoid valve 1326 is thus energized, it functions to produce a slightly lower pressure than normal, as determined by the setting of the hand wheel 1250. This slightly decreased pressure is sufficient to overcome frictional drag so that the actuator rod 76 can be moved inwardly, i.e., movement along the arrow 1280 in FIG. 11 as a spot weld at point A is being made.

In the event that the conveyor is moving in the opposite direction from the arrow 1276, a minus signal will be produced on the conductor 1302 at the start of each spot welding operation, this signal being applied to the reset terminal of the flip-flop 1304 so that this flip-flop is reset to its initial condition and a signal appearing on the output conductor 1328 thereof is supplied either to the conductor 1320 or the conductor 1324 to selectively energize one or the other of the solenoid valves 1322 or 1326 depending upon the quadrant in which the manipulator arm is positioned.

While the above-described frictional drag compensation arrangement has been illustrated as controlled in accordance with the signal from the most significant digit of the rotary encoder 326, it will be understood that other suitable arrangements may be employed to provide the desired frictional drag compensation. For example, a mechanical cam arrangement may be connected to the rotary trunk 60 (FIG. 8) of the manipulator and actuate a suitable switching arrangement so that a plus or minus signal is available for energization of the relay 1314 in the two quadrants 1294 or 1296. Also, as indicated above, the plus and minus control of frictional drag compensation may, in some instances not be required where the movement of the conveyor relative to the fixed base 1274 is always in the same direction.

As discussed heretofore in connection with FIG. 10, the new position of the manipulator arm, i.e., the position 1268 in FIG. 10, is presented as soon as the weld is initiated at position 1260. Accordingly, an error signal is developed during the period of movement 1264 while the spot weld is being made. If this error signal would be supplied to the servo valves of each axis it would tend to destroy the force balance established by energization of the solenoid valves 1226 to 1234, inclusive. In order to prevent this effect, the weld signal relay 1142 is provided with another set of contacts 1340 (FIG. 7) which are normally closed so that minus 18 volts is normally supplied to the servo amplifiers in the distance circuits 1154. In this connection it will be recalled that the alarm relay 1220 is normally energized during periods of normal operation of the system so that the contacts 1249 thereof are closed during normal operating conditions and minus 18 volts is supplied through the series connected contacts 1249 and 1340 under normal conditions. However, as soon as the weld signal relay 1182 is energized at the start of each spot welding cycle, the contacts 1340 are opened so that the supply voltage for the servo amplifiers in all five controlled axes is removed. Accordingly, even though error signals are presented to the inputs of these servo amplifiers, no output signal is provided for the corresponding servo valve so that all five servo valves are returned to their neutral or closed positions and do not interfere with the above-described force balancing action of the hydraulic actuators during each spot welding operation.

When the manipulator arm is pulled along by engagement of the welding electrodes 1030, 1032 with the moving workpiece, it will be evident that movement in other controlled axes may be required in response to the external force thus exerted on the end of the manipulator arm. However, frictional drag compensation has been found to be required only for the out-in axis due to the fact that the frictional drag of the actuator 72 is relatively large. The frictional drag in the other controlled axes of the manipulator is sufficiently small to permit movement of the manipulator in these axes by engagement with the workpiece when the corresponding hydraulic actuators are disabled in the manner described above. However, it will be understood that a similar frictional drag compensation arrangement can be employed for any one of the other controlled axes of the manipulator if the external force tending to move the manipulator arm in that axis is not sufficiently great to overcome the frictional drag in that axis without damaging the workpiece.

While there have been illustrated and described various embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. A programmable manipulator having a fixed base and a manipulator arm mounted on said fixed base for movement about a vertical axis and having an end portion movable in a plurality of axes, a workpiece movable along a predetermined path, means for positioning the workpiece at different locations along said path, means for moving said manipulator arm to positions corresponding to said different locations along said path, means for recording the position of said arm at said different points, and means for causing said arm to move successively to said recorded positions while the workpiece is moved continuously along said path.

2. The method of programming a fixed base manipulator for cooperation with a workpiece on a continuously moving conveyor said manipulator having an arm which is movable in a plurality of axes, which comprises the steps of successively positioning the workpiece at different stationary locations along said conveyor, successively moving said manipulator arm to positions corresponding to different points on said workpiece when said workpiece is positioned at said different locations, and recording said corresponding positions to which said arm is successively moved.

3. The method of programming a fixed base manipulator to perform a series of operations on a workpiece while the workpiece is continuously moving along a predetermined path, said manipulator having an arm which is movable relative to the fixed base thereof, which comprises the steps of successively stopping the workpiece at different locations along said path, successively moving said manipulator arm to positions corresponding to different points on said workpiece when said workpiece is stopped at said different locations, and recording said corresponding positions to which said arm is successively moved.

4. The method of programming a fixed base manipulator to perform a series of operations on a workpiece while the workpiece is continuously moving along a predetermined path, said manipulator having an arm which is movable relative to the fixed base thereof, which comprises the steps of moving said workpiece to a first location along said path, moving said manipulator arm to a first position corresponding to a first point on said workpiece while said workpiece remains stationary at said first location, recording said first position of said manipulator arm, moving said workpiece to a second location along said path, moving said manipulator arm to a second position corresponding to a second point on said workpiece while said workpiece remains stationary at said second location, and recording said second position of said manipulator arm.

5. The method of moving the manipulator arm of a fixed base manipulator to perform a work operation on continuously moving workpieces, which comprises the steps of, initially positioning a representative workpiece at different stationary locations spaced along a desired path of movement of the workpieces, positioning said manipulator arm at a different point on said representative workpiece for each of said stationary locations thereof in accordance with a desired work operation to be performed on the workpieces when moving continuously along said path, recording said different positions of said manipulator arm, and moving said manipulator arm to said different recorded positions in timed relation to continuous movement of a workpiece along said path.

6. The method of moving the manipulator arm of a fixed base manipulator to perform a work operation on continuously moving workpieces, which comprises the steps of, initially positioning a representative workpiece at different stationary locations spaced along a desired path of movement of the workpieces, positioning said manipulator arm at a different point on said representative workpiece for each of said stationary locations thereof in accordance with a desired work operation to be performed on the workpieces when moving continuously along said path, recording said different positions of said manipulator arm as a series of different program steps of a repeatable program, continuously moving workpieces along said path at a uniform rate, and repetitively moving said manipulator arm through said series of program steps in timed relation to movement of the workpieces along said path.

7. The combination of claim 1, which includes means for recording the positions of said representative workpiece at said stationary locations in correlation with said recorded manipulator arm positions, and means for controlling movement of said arm from one recorded position to the next in accordance with said recorded workpiece positions.

8. In a programmed manipulator, a manipulator arm, means for moving said arm in a plurality of axes, means for developing a first signal representing the absolute position of said arm in one of said axes, means for developing in sequence a series of command signals corresponding to desired positions of said arm, means for comparing said first signal and one of said command signals in said series to develop an error signal representing the difference therebetween, means responsive to said error signal for controlling said moving means to move said arm along said one axis in the direction to reduce said error signal, a continuously moving conveyor positioned adjacent said programmed manipulator, means for developing a second signal representing the position of a workpiece on said conveyor as it moves past said programmed manipulator, and means responsive to said second signal for connecting the next command signal in said series to said comparing means.

9. The combination of claim 8 wherein said command signals each include a signal component corresponding to a different position of said conveyor, and conveyor synchronizing means jointly responsive to said command signal component and said second signal for connecting the next command signal in said series to said comparing means.

10. In a programmed manipulator apparatus, the combination of, a manipulator arm, means for moving said arm in a plurality of different axes, a continuously moving conveyor positioned adjacent said programmed manipulator, means for developing in sequence a series of digital command signals representing a desired position of said arm in each of said axes, means for developing a digital command signal representing a desired position of said conveyor, means for developing a digital position signal representing the actual position of said arm in each of said axes, means for developing a position signal representing the actual position of said conveyor, comparing means common to said axes for comparing command and position signals and developing an error signal representative of the difference therebetween, means responsive to said error signal for controlling said moving means to move said arm along one of said axes in the direction to reduce said error signal, and means for sequentially connecting said comparing means to different command and position signal combinations corresponding to movement in different ones of said axes and movement of said conveyor during different periods in a repetitive multiplex scanning cycle.

11. The combination of claim 10, wherein said command signal developing means is arranged sequentially to develop different groups of command signals corresponding to different desired positions of said arm, a storage circuit is provided for each of said axes and said conveyor, means for distributing error signals to said storage circuits during the multiplex period when the corresponding command and position signals are connected to said comparing means, and means connected to the storage circuit for said conveyor and operative when the error signal developed therein reaches a predetermined value for controlling said command signal developing means to develop the next group of said command signals in said series.

12. The combination of claim 11, wherein said command signal developing means also selectively develops a control signal with predetermined groups of said command signals, and means jointly responsive to said control signal and the error signal developed in said conveyor storage circuit for controlling said command signal developing means to develop the next group of said command signals in said series.

13. In a programmed manipulator, the combination of, a manipulator arm, means for moving said arm along a plurality of axes, a continuously moving conveyor positioned adjacent said programmed manipulator, first encoder means for developing a digital signal corresponding to the absolute position of said arm in one of said axes, second encoder means for developing a digital signal representing the actual position of said conveyor, means for developing a sequence of digital command signals having one component corresponding to desired positions of said arm along said one axis, and another component corresponding to a desired position of said conveyor, means for comparing the encoder signal of said first encoder means and said one component of one of said command signals in said sequence to develop an error signal equal to the difference therebetween, means responsive to said error signal for controlling said moving means to move said arm along said one axis in the direction to reduce said error signal, means for developing a control signal when said error signal is reduced to a predetermined magnitude, means normally responsive to said control signal for connecting the next command signal in said sequence to said comparing means, and means jointly controlled by the digital signal developed by said second encoder means and said other component of the command signal for selectively connecting the next command signal in said sequence to said comparing means independently of said control signal.

14. The combination of claim 13, which includes second comparing means for comparing said second encoder signal and said other component of the command signal and developing an output signal when said second encoder signal has a value which is within a predetermined amount of said other component of the command signal, and means responsive to said output signal for connecting the next command signal in said sequence to said first named comparing means.

15. In a mass production assembly line, the combination of a continuously moving conveyor arranged to carry substantially identical workpieces past a work station, a programmed manipulator having a fixed base positioned at said work station and having a manipulator arm mounted on said fixed base for movement about a vertical axis so that the outer end thereof is movable along a given length of said conveyor, control means for successively moving said manipulator arm to different positions within said given conveyor length, said different positions being sufficiently closely spaced with respect to one another that the end of said arm moves substantially in synchronism with a workpiece on said conveyor while at the same time describing a predetermined work path in relation to said moving workpiece, means for initially positioning said arm at a point outside the path of workpieces on said conveyor, and means for initiating movement of said arm over said predetermined work path in timed relation to the presence of a workpiece within said given conveyor length.

16. In a mass production assembly line, the combination of a continuously moving conveyor arranged to carry substantially identical workpieces past a work station, a programmed manipulator having a fixed base positioned at said work station and having a manipulator arm mounted on said fixed base for movement about a vertical axis so that the outer end thereof is movable along a given length of said conveyor, program means for developing a series of command signals corresponding to different positions of said manipulator arm within said given conveyor length, control means responsive to said series of command signals for moving said arm substantially in synchronism with a moving workpiece on said conveyor while at the same time describing a predetermined work path in relation to said moving workpiece, means for initially positioning said arm at a point outside the path of workpieces on said conveyor, and means for initiating movement of said arm over said predetermined work path in timed relation to the presence of a workpiece within said given conveyor length.

17. The combination of claim 16, wherein said command signals correspond to closely spaced positions of said workpiece as it moves past said work station.

18. The combination of claim 16, wherein said program means also develops control signals in association with at least some of said command signals, means for comparing one of said control signals with the actual position of said moving workpiece, and means controlled by said comparing means for shifting to the next command signals.

19. The combination of claim 16, which includes means for continuously comparing said command signals with the actual position of said arm, and means controlled by said comparing means for discontinuing driving movement of said manipulator arm when said arm deviates from said work path by a predetermined amount.

20. The combination of claim 19, which includes an alarm circuit and means for energizing said alarm circuit when said driving movement of said manipulator arm is discontinued.

21. In a mass production assembly line, the combination of a continuously moving conveyor arranged to carry substantially identical workpieces past a work station, a programmed manipulator having a fixed base positioned at said work station and having a manipulator arm mounted on said fixed base for movement about a vertical axis so that the outer end thereof is movable along a given length of said conveyor, a welding gun on the end of said manipulator arm, control means for successively moving said manipulator arm to different positions within said given conveyor length, said different positions being sufficiently closely spaced with respect to one another that said arm moves substantially in synchronism with a workpiece on said conveyor while at the same time describing a predetermined work path in relation to said moving workpiece, means included in said control means for energizing said welding gun at predetermined points along said work path, means for initially positioning said arm at a point outside the path of workpieces on said conveyor, and means for initiating movement of said arm over said predetermined work path in timed relation to the presence of a workpiece within said given conveyor length.

22. In a mass production assembly line, the combination of a continuously moving conveyor arranged to carry substantially identical workpieces past a work station, a programmed manipulator having a fixed base positioned at said work station and having a manipulator arm mounted on said fixed base for movement about a vertical axis so that the outer end thereof is movable along a given length of said conveyor, a welding gun at the end of said manipulator arm, program means for developing a series of command signals corresponding to different positions of said manipulator arm within said given conveyor length, control means responsive to said series of command signal for moving said manipulator arm so that said welding gun describes a predetermined work path in relation to a moving workpiece on said conveyor, means for energizing said weld gun at predetermined points along said work path, means for initially positioning said arm at a point outside the path of workpieces on said conveyor, and means for initiating movement of said arm over said predetermined work path in timed relation to the presence of a workpiece within said given conveyor length.

23. The combination of claim 22, wherein said welding gun includes a pair of jaws which are clamped to the moving workpiece while a weld is being made, and means for disabling said manipulator arm moving means during periods when said welding jaws are clamped to the moving workpiece.

24. The combination of claim 23, which includes means for compensating for the frictional drag of said arm moving means when disabled, whereby said arm is moved by engagement of said welding jaws with the moving workpiece and without damaging the workpiece.

25. A programmed manipulator having an arm and means for moving said arm in a plurality of axes, means for moving a workpiece continuously along a predetermined path, means for storing a plurality of positions of said arm at which positions an operation is to be initiated on the workpiece, means for initiating movement of said arm to the first one of said stored positions in timed relation to said moving workpiece, means responsive to movement of said workpiece to said first position for initiating a work operation on said workpiece as it is moving along said path, means responsive to initiation of said work operation at said first stored position for disabling said arm moving means, whereby said arm is permitted to move with said workpiece during the performance of said work operation thereon, and means for moving said arm to the next one of said stored positions after said work operation has been completed.

26. In a programmed manipulator, the combination of, a manipulator arm, means for moving said arm through a desired sequence of movements to perform a work operation, and means for disabling said arm moving means at a predetermined point in said work operation, thereby to permit said arm to be moved by an external force exerted thereon.

27. The combination of claim 26, which includes means carried by said arm for connecting said arm to a moving workpiece, and said disabling means is effective when said arm is connected to a moving workpiece by said connecting means.

28. The combination of claim 27, wherein said connecting means includes a pair of welding jaws and said disabling means is effective during at least a portion of the time said jaws are in engagement with a moving workpiece.

29. In a programmed manipulator, the combination of, a manipulator arm, means including hydraulic actuator means for moving said arm through a desired sequence of movements in a given axis to perform a work operation, and means for rendering said hydraulic actuator means ineffective to move said arm at a predetermined point in said work operation, thereby to permit said arm to be moved by exertion of an external force thereon at said predetermined point in said work operation.

30. The combination of claim 29, wherein said hydraulic actuator means includes a movable element, and means for equalizing the pressure on opposite sides of said movable element at said predetermined point in said work operation.

31. The combination of claim 29, wherein said hydraulic actuator means when rendered ineffective has a predetermined frictional load which must be overcome to move said arm in response to said external force, and means for compensating at least partially for said predetermined frictional load by exerting a force on said hydraulic actuator means in a direction tending to assist said external force, whereby said arm may be moved by a relatively small external force when said hydraulic actuator means is rendered ineffective.

32. In a programmed manipulator, the combination of, a manipulator arm, means for rotating said arm about a vertical axis, means for extending and retracting said arm relative to said vertical axis, means for controlling said rotating means and said extending and retracting means to move said arm through a desired sequence of movements to perform a work operation, means for disabling said rotating means at a predetermined point in said work operation, thereby to permit said arm to be moved by exertion of an external force thereon at said predetermined point in said work operation, and means for exerting a compensating force on said arm which assists movement of said arm by said external force.

33. The combination of claim 32, wherein said compensating force is continuously exerted on said arm during periods when said rotating means is disabled.

34. The combination of claim 32, wherein said compensating force which is exerted on said arm is constant and is of sufficient magnitude to compensate for the frictional load of said extending and retracting means.

35. The combination of claim 32, wherein said arm is movable through two sectors of rotary movement in which sectors different compensating forces are required to assist said external force, and means for controlling said compensating force exerting means in accordance with the sector of rotary movement in which said arm is located when said external force is applied thereto.

36. The combination of claim 32, wherein different compensating forces are required to assist said external force depending upon the direction of movement of said arm in response to said external force, means for determining the direction of movement of said arm in response to said external force at the time said rotating means is disabled, and means for controlling said compensating force exerting means in accordance with said direction determining means.

37. A programmable manipulator having an arm movable in a plurality of axes, a workpiece movable along a predetermined path, means for positioning the workpiece at different locations along said path, means for moving said manipulator arm in said plurality of axes to positions corresponding to said different locations along said path, means for recording the position of said arm at said different points, means for causing said arm to move successively to said recorded positions while the workpiece is moved continuously along said path, and means for compensating said last named means for changes in the speed of said workpiece along said path.

38. The arrangement as set forth in claim 9, which includes means for compensating said conveyor synchronizing means for changes in the speed of said conveyor.

39. In a programmed manipulator, a manipulator arm, means for moving said arm in a plurality of axes, means for developing a first signal representing the absolute position of said arm in one of said axes, means for developing in sequence a series of command signals corresponding to desired positions of said arm, first comparing means for comparing said first signal and one of said position command signals in said series to develop an error signal representing the difference therebetween, means responsive to said error signal for controlling said moving means to move said arm along said one axis in the direction to reduce said error signal, a continuously moving conveyor positioned adjacent said programmed manipulator, means for developing a series of conveyor command signals correlated with said series of arm position command signals and corresponding to different positions of said conveyor, means for developing a second signal representing the position of a workpiece on said conveyor as it moves past said programmed manipulator, second comparing means for comparing said second signal and one of said conveyor command signals to develop a conveyor error signal representing the difference therebetween, and means responsive to said conveyor error signal for connecting the next arm position command signal in said series of arm position command signals to said first comparing means.

40. The combination of claim 39, which includes means responsive to said conveyor error signal for connecting the next conveyor command signal in said series of conveyor command signals to said second comparing means.

41. The combination of claim 39, which includes means for developing a reference signal, and third comparing means for comparing said conveyor error signal and said reference signal and connecting the next arm position command signal in said series of arm position command signals to said first comparing means when said conveyor error signal attains a predetermined relationship to said reference signal, said connection of the next arm position command signal to said first comparing means occurring when the error signal developed by said first comparing means has a substantial value so that said manipulator arm is moved smoothly through the positions corresponding to said arm position command signals and in timed relation to a workpiece on said conveyor.

42. The combination of claim 41, wherein said next arm position command signal is connected to said first comparing means when said conveyor error signal is equal to said reference signal, and means for varying said reference signal so that movement of said arm may be coordinated with the speed of said conveyor.

43. The combination of claim 42, which includes means for varying said reference signal in proportion to the speed of said conveyor so that movement of said arm is automatically adjusted in coordination with variations in the speed of said conveyor.

44. The method of claim 6, which includes the steps of recording said different stationary locations of said representative workpiece, and controlling the sequential selection of the different program steps of said repeatable program in accordance with said recorded stationary locations of said representative workpiece.

45. The method of claim 44, which includes the step of shifting to the next program step substantially ahead of the recorded manipulator arm position so that said work operation is performed smoothly in synchronism with movement of the workpieces along said path.

46. The combination of claim 8, which includes means for developing an output signal when said error signal has a predetermined value, and means for controlling said command signal connecting means in response to said output signal.

47. The combination of claim 46, which includes means for developing a control signal in correlation with predetermined ones of said command signals, and means responsive to said control signal for controlling said command signal connecting means selectively to respond to said second signal and said output signal.

* * * * *

PO-1050
(5/69)

UNITED STATES PATENT OFFICE
CERTIFICATE OF CORRECTION

Patent No. 3,744,032　　　　　　　　Dated July 3, 1973

Inventor(s) Engelberger et al

It is certified that error appears in the above-identified patent and that said Letters Patent are hereby corrected as shown below:

Column 37, line 51, before "control" there should be inserted --program--;

line 53, "within" should read --throughout--;

Column 38, line 8, after "arm" there should be inserted --and different positions of the workpiece--;

line 49, before "control" there should be inserted --program--;

line 51, "within" should read --throughout--;

Column 39, line 8, after "arm" there should be inserted --and different positions of the workpiece--;

line 9, "signal" should read --signals--.

Title page, line 6, after "Assignee:" the word "Unimotion" should read --Unimation--.

Signed and sealed this 20th day of November 1973.

(SEAL)
Attest:

EDWARD M. FLETCHER, JR.　　　　　　　RENE D. TEGTMEYER
Attesting Officer　　　　　　　　　　　Acting Commissioner of Patents